US012695919B2

(12) United States Patent
Wang

(10) Patent No.: US 12,695,919 B2
(45) Date of Patent: Jul. 28, 2026

(54) CODING METHOD, DECODING METHOD, ENCODER AND DECODER

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/910,348

(22) Filed: Oct. 9, 2024

(65) Prior Publication Data

US 2025/0030897 A1 Jan. 23, 2025

Related U.S. Application Data

(63) Continuation of application No. PCT/CN2022/086089, filed on Apr. 11, 2022.

(51) Int. Cl.
*H04N 19/70* (2014.01)
*H04N 19/105* (2014.01)
*H04N 19/176* (2014.01)

(52) U.S. Cl.
CPC ........... *H04N 19/70* (2014.11); *H04N 19/105* (2014.11); *H04N 19/176* (2014.11)

(58) Field of Classification Search
CPC .... H04N 19/70; H04N 19/105; H04N 19/176; H04N 19/13; H04N 19/91
See application file for complete search history.

(56) References Cited

U.S. PATENT DOCUMENTS

| | | | | |
|---|---|---|---|---|
| 11,356,693 | B2 | 6/2022 | Chien | |
| 11,778,191 | B2 * | 10/2023 | Ji | H04N 19/129 |
| | | | | 375/240.18 |
| 12,047,577 | B2 * | 7/2024 | Chen | H04N 19/52 |
| 12,445,616 | B2 * | 10/2025 | Chen | H04N 19/91 |

(Continued)

FOREIGN PATENT DOCUMENTS

| | | |
|---|---|---|
| CN | 105025296 A | 11/2015 |
| CN | 112040247 A | 12/2020 |

(Continued)

OTHER PUBLICATIONS

International Search Report in the international application No. PCT/CN2022/086089, mailed on Jan. 9, 2023, 5 pages with English translation.

(Continued)

*Primary Examiner* — Jared Walker
(74) *Attorney, Agent, or Firm* — BAYES PLLC

(57) ABSTRACT

Disclosed in the present application are a coding method, a decoding method, an encoder and a decoder. The coding method includes: selecting a plurality of coded related blocks corresponding to a current block from a predetermined area, the predetermined area comprising an area having a correlation with the current block; on the basis of information of the plurality of related blocks, determining a context index parameter of a first syntax element of the current block; and on the basis of a context corresponding to the context index parameter, coding the first syntax element of the current block.

20 Claims, 14 Drawing Sheets

(56) References Cited

U.S. PATENT DOCUMENTS

| | | | | |
|---|---|---|---|---|
| 2018/0070100 A1* | 3/2018 | Chen | ............... | H04N 19/597 |
| 2018/0199072 A1* | 7/2018 | Li | ............... | H04N 19/186 |
| 2020/0029091 A1 | 1/2020 | Chien et al. | | |
| 2020/0154107 A1 | 5/2020 | Zhao et al. | | |
| 2020/0396488 A1* | 12/2020 | Koo | ............... | H04N 19/18 |
| 2021/0195198 A1* | 6/2021 | Chen | ............... | H04N 19/91 |
| 2021/0314595 A1* | 10/2021 | Zhang | ............... | H04N 19/105 |
| 2021/0385505 A1* | 12/2021 | Lee | ............... | H04N 19/51 |
| 2022/0070439 A1* | 3/2022 | Laroche | ............... | H04N 19/105 |
| 2022/0116662 A1* | 4/2022 | Chen | ............... | H04N 19/13 |
| 2022/0191500 A1* | 6/2022 | Nam | ............... | H04N 19/13 |
| 2022/0264124 A1 | 8/2022 | Deng et al. | | |
| 2022/0400275 A1* | 12/2022 | Zhao | ............... | H04N 19/46 |
| 2022/0417520 A1* | 12/2022 | Yoo | ............... | H04N 19/91 |
| 2023/0099049 A1* | 3/2023 | Mammou | ............... | H04N 19/96 |
| | | | | 382/232 |
| 2023/0328263 A1 | 10/2023 | Deng et al. | | |
| 2024/0333935 A1* | 10/2024 | Chen | ............... | H04N 19/176 |

FOREIGN PATENT DOCUMENTS

| | | |
|---|---|---|
| CN | 113647112 A | 11/2021 |
| CN | 114641997 A | 6/2022 |
| CN | 117579823 A | 2/2024 |
| JP | 2015516763 A | 6/2015 |
| JP | 2021536710 A | 12/2021 |
| JP | 2022553789 A | 12/2022 |
| JP | 2024026141 A | 2/2024 |
| KR | 20220082847 A | 6/2022 |
| WO | 2020185500 A1 | 9/2020 |
| WO | 2021083188 A1 | 5/2021 |

OTHER PUBLICATIONS

English translation of the Written Opinion of the International Search Authority in the international application No. PCT/CN2022/086089, mailed on Jan. 9, 2023, 6 pages with English translation.

Supplementary European Search Report in the European application No. 22936764.4, mailed on Jan. 23, 2026.

First Office Action of the Japanese application No. 2024-560482, issued on Jan. 6, 2026.

Benjamin Bross, et al., Versatile Video Coding (Draft 10), Joint Video Experts Team (JVET) of ITU-T SG 16 WP 3 and ISO/IEC JTC 1/SC, 29/WG 11 19th Meeting: by teleconference, Jun. 22-Jul. 1, 2020, [JVETS2001-vH], Sep. 4, 2020, pp. 390-397,426-431,437-438.

* cited by examiner

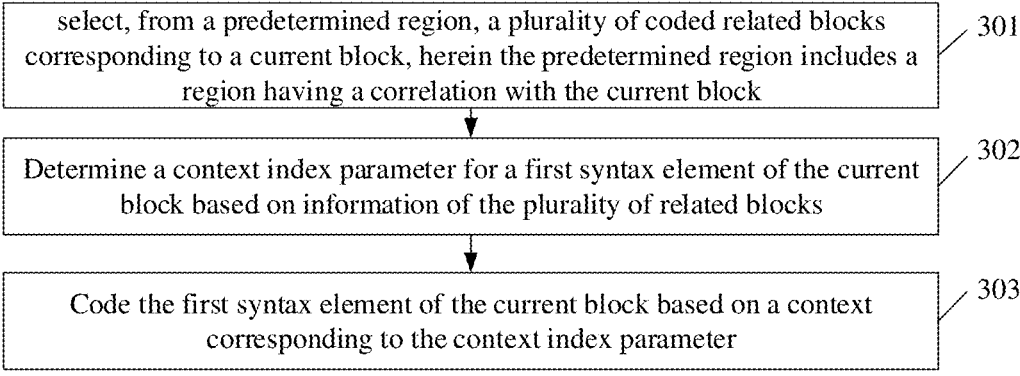

| select, from a predetermined region, a plurality of coded related blocks corresponding to a current block, herein the predetermined region includes a region having a correlation with the current block | 301 |

| Determine a context index parameter for a first syntax element of the current block based on information of the plurality of related blocks | 302 |

| Code the first syntax element of the current block based on a context corresponding to the context index parameter | 303 |

FIG. 3

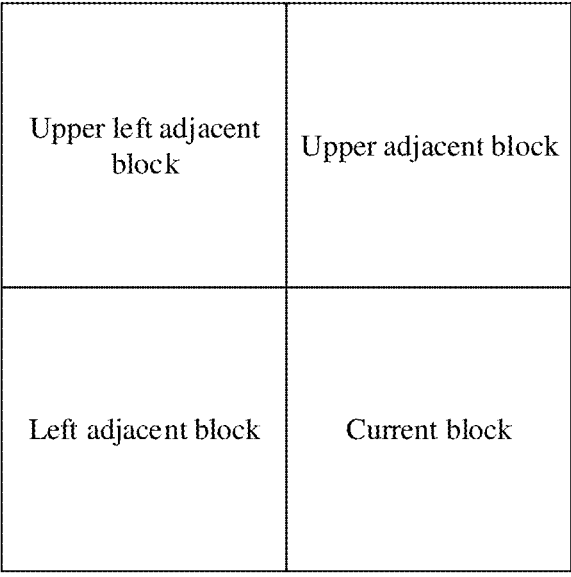

| Upper left adjacent block | Upper adjacent block |
| Left adjacent block | Current block |

FIG. 4

CODING METHOD, DECODING METHOD, ENCODER AND DECODER

CROSS-REFERENCE TO RELATED APPLICATION

The present application is a continuation of International Application No. PCT/CN2022/086089 filed on Apr. 11, 2022, the disclosure of which is hereby incorporated by reference in its entirety.

TECHNICAL FIELD

The present application relates to the technical field of video image processing technology, and particularly relates to a coding method, a decoding method, an encoder and a decoder.

BACKGROUND

Context-based adaptive binary arithmetic coding (CABAC) is a common entropy coding method. CABAC is used for entropy coding in high efficiency video coding (HEVC), versatile video coding (VVC), and the like. CABAC is used for entropy coding/entropy decoding of syntax elements.

CABAC can improve compression efficiency by using a context. As requirements for compression efficiency increase, various new prediction modes, transform modes, and so on are added, along with more syntax elements used to control selection of these modes, which leads to an increasing proportion of syntax elements used to control various modes in bitstreams. Therefore, in order to further improve the compression efficiency of the entire system, it is increasingly important to improve compression efficiency for syntax elements.

SUMMARY

To solve the above technical problems, embodiments of the present application provide coding and decoding methods, an encoder and a decoder, which enable matching of a more suitable context for a first syntax element of a current block, thereby improving compression efficiency for syntax elements.

In a first aspect, an embodiment of the present application provides a coding method, applied to an encoder, the coding method includes the following operations.

A plurality of coded related blocks corresponding to a current block is selected from a predetermined region, herein the predetermined region includes a region having a correlation with the current block.

A context index parameter for a first syntax element of the current block is determined based on information of the plurality of related blocks.

The first syntax element of the current block is coded based on a context corresponding to the context index parameter.

In a second aspect, an embodiment of the present application provides a decoding method, applied to a decoder, the decoding method includes the following operations.

A bitstream is decoded to acquire information to be decoded of a first syntax element of a current block.

A plurality of decoded related blocks corresponding to the current block is selected from a predetermined region, herein the predetermined region includes a region having a correlation with the current block.

A context index parameter for the first syntax element of the current block is determined based on information of the plurality of related blocks.

The information to be decoded is decoded based on a context corresponding to the context index parameter to acquire the first syntax element of the current block.

In a third aspect, an embodiment of the present application further provides an encoder, which includes: a memory and a processor, herein the memory is configured to store a computer program executable on the processor, and the processor is configured to implement, when executing the program, the coding method for an encoder.

In a fourth aspect, an embodiment of the present application further provides a decoder, which includes: a memory and a processor, herein the memory is configured to store a computer program executable on the processor, and the processor is configured to implement, when executing the program, the decoding method for a decoder.

BRIEF DESCRIPTION OF THE DRAWINGS

FIG. 3 is a schematic flowchart of a coding method provided in an embodiment of the present application;

FIG. 4 is a first schematic diagram of selection positions of related blocks in an embodiment of the present application;

DETAILED DESCRIPTION

To enable characteristics and technical content of embodiments of the present application to be more fully understood, implementations of the embodiments of the present application will be described in detail below with reference to the drawings, which are for reference and description only, and are not intended to limit the embodiments of the present application.

Current common video coding standards (e.g., versatile video coding (VVC)) all employ block-based hybrid coding. Each frame in a video is partitioned into largest coding units (LCUs), or coding tree units (CTUs), of square shape with a same size (e.g., 128×128, 64×64, etc.). Each largest coding unit may be divided into rectangular coding units (CUs) according to rules. The coding units may further be divided into prediction units (PUs), transform units (TUs), etc.

At a coding end, a picture is divided into blocks. For a current block (CU), a predicted block for the current block is generated through intra-frame prediction or inter-frame prediction. The predicted block is subtracted from an original block of the current block to acquire a residual block. The residual block is transformed and quantized to acquire a quantized coefficient matrix. The quantized coefficient matrix is entropy-coded and output into a bitstream.

Figure 1:
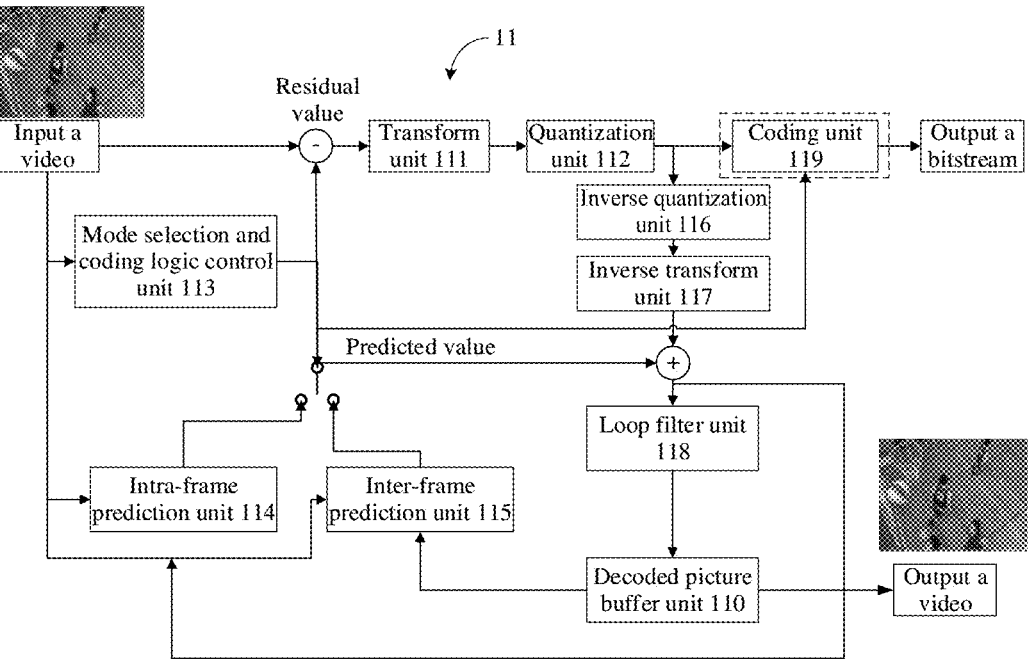
FIG. 1 is a video coding system.

Exemplarily, FIG. 1 is a video coding system. As shown in FIG. 1, the video coding system 11 includes: a transform unit 111, a quantization unit 112, a mode selection and coding control logic unit 113, an intra-frame prediction unit 114, an inter-frame prediction unit 115 (including: motion compensation and motion estimation), an inverse quantization unit 116, an inverse transform unit 117, a loop filter unit 118, a coding unit 119, and a decoded picture buffer unit 110. For an input original video signal, a picture is divided into blocks. A coding mode is determined via the mode selection and coding control logic unit 113. For a current block, a predicted block of the current block is generated using intra-frame prediction or inter-frame prediction. Since there is strong correlation between adjacent pixels in a frame of a video, an intra-frame prediction method is used in video coding and decoding techniques to eliminate spatial redundancy between adjacent pixels. Since there is strong similarity between adjacent frames in a video, an inter-frame prediction method is used in video coding and decoding techniques to eliminate temporal redundancy between adjacent frames, thereby improving coding efficiency. The predicted block is subtracted from an original block of the current block to acquire a residual block. The residual block passes through the transform unit 111 and the quantization unit 112 to acquire a quantized coefficient matrix. The quantized coefficient matrix is entropy-coded by the coding unit 119, and output into a bitstream. Further, the quantized coefficient matrix passes through the inverse quantization unit 116 and the inverse transform unit 117 to acquire a reconstructed residual block. The reconstructed residual block passes through the loop filter unit 118 to remove blocking artifacts. Then, the reconstructed residual block is added to a predicted block in a frame of the decoded picture buffer unit 110 to generate a reconstructed video reconstruction block. The decoded picture buffer unit 110 is configured to store the reconstructed video reconstruction block for prediction reference. As coding of pictures of a video proceeds, new reconstructed video reconstruction blocks are constantly generated. These reconstructed video reconstruction blocks are all stored in the decoded picture buffer unit 110.

At a decoding end, by parsing and analyzing according to existing information, it is possible to determine block division information, mode information or parameter information of prediction, transform, quantification, entropy coding, loop filtering, etc., that are the same as those at the coding end, so as to ensure that a decoded image acquired at the coding end is the same as a decoded image acquired at the decoding end.

Figure 2:
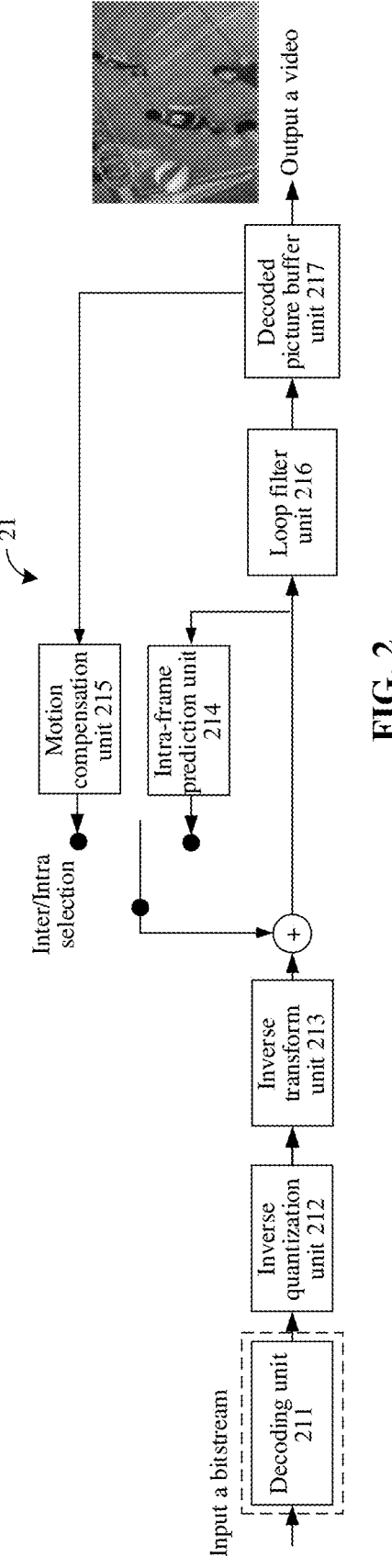
FIG. 2 is a video decoding system.

Exemplarily, FIG. 2 is a video decoding system. FIG. 2 is a schematic structure diagram of a video decoding system according to an embodiment of the present application. As shown in FIG. 2, the video decoding system 21 includes: a decoding unit 211, an inverse quantization unit 212, an inverse transform unit 213, an intra-frame prediction unit 214, a motion compensation unit 215, a loop filter unit 216, and a decoded picture buffer unit 217. After an input video signal is coding-processed by the video coding system 11, a bitstream of the video signal is output. The bitstream is input into the video decoding system 21, and first passes through the decoding unit 211 to acquire a decoded quantized coefficient matrix. The quantized coefficient matrix is processed by the inverse quantization unit 212 and the inverse transform unit 213 to generate a residual block in the pixel domain. The intra-frame prediction unit 214 may be configured to generate, based on a determined intra-frame prediction direction and data from previously decoded blocks of a current frame or picture, a predicted block of a current video block. The motion compensation unit 215 determines prediction information for the current block by analyzing motion vectors and other associated syntax elements, and uses the prediction information to generate a predicted block of the current block. Summation is performed with respect to the residual block from the inverse transform unit 212 and the inverse quantization unit 213 and the corresponding predicted block generated by the intra-frame prediction unit 214 or the motion compensation unit 215, so as to form a decoded reconstructed block. The decoded reconstructed block passes through the loop filter unit 216 to remove blocking artifacts, which improves video quality. The decoded reconstructed block is then stored in the decoded picture buffer unit 217, and the decoded picture buffer unit 217 stores a reference image for subsequent intra-frame prediction or motion compensation, and is also configured to output a video signal to acquire a restored original video signal.

Block division information, various modes and parameter information of prediction, transform, and quantization, coefficients, and the like are written into the bitstream via entropy coding. Assuming that the probabilities of different elements are different, by assigning a shorter code word to an element with a higher probability of occurrence and assigning a longer code word to an element with a lower probability of occurrence, coding efficiency higher than that of fixed-length coding can be achieved. However, if the probabilities of different elements are similar or substantially the same, the compression efficiency provided by entropy coding is limited. Context-based adaptive binary arithmetic coding (CABAC) is a common entropy coding method. CABAC is used for entropy coding in HEVC, VVC, and the like. A context can be used in CABAC to improve compression efficiency. The context provides an estimated probability for a current syntax element. The system encodes and decodes the current syntax element according to the estimated probability, and updates the context according to the value of the current syntax element.

A coding method provided in the embodiments of the present application is mainly applied to the coding unit 119 of the video coding system 11 for coding a syntax element. A decoding method provided in the embodiments of the present application is mainly applied to the decoding unit 211 of the video decoding system 21 for decoding a syntax element.

On that basis, the technical solutions in the present application will be described in further detail below with reference to the drawings and the embodiments. Before detailed description is provided, it should be noted that the terms "first", "second", "third", and so on are mentioned throughout the specification merely to distinguish different features from each other, and do not have any function of defining priorities, temporal orders, size relationships, or the like.

The embodiments of the present application provide a coding method. The method is applied to a video coding device, i.e., an encoder. Functions achieved by the method may be implemented by a processor in a video coding device invoking program code. Certainly, the program code may be stored in a computer storage medium. Hence, the video coding device includes at least a processor and a storage medium.

FIG. 3 is a schematic flowchart of a coding method provided in an embodiment of the present application. The method is applied to an encoder. As shown in FIG. 3, the method includes the following operations.

At operation 301, a plurality of coded related blocks corresponding to a current block are selected from a predetermined region, herein the predetermined region includes a region having a correlation with the current block.

In the embodiment of the present application, the plurality of related blocks refer to at least three related blocks. The related blocks may be understood as picture blocks having a spatial correlation with the current block and used for determining a context of a syntax element of the current block. The coded related blocks may also be understood as reconstructed blocks that are reconstructed at the coding end.

Figure 5:
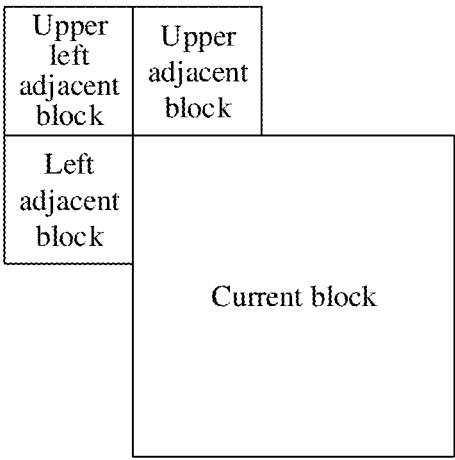
FIG. 5 is a second schematic diagram of selection positions of related blocks in an embodiment of the present application.

In actual application, due to the picture block partition manner, the size of a related block may be the same as or different from the size of the current block. FIG. 4 is a first schematic diagram of selection positions of related blocks in an embodiment of the present application. As shown in FIG. 4, the related blocks include a left adjacent block, an upper adjacent block, and an upper left adjacent block of the current block, and the size of each related block is the same as the size of the current block. FIG. 5 is a second schematic diagram of selection positions of related blocks in an embodiment of the present application. As shown in FIG. 5, the related blocks include a left adjacent block, an upper adjacent block, and an upper left adjacent block of the current block, and the size of each related block is different from the size of the current block.

In some embodiments, the predetermined region includes an adjacent region of the current block and/or a non-adjacent region of the current block. When the predetermined region includes an adjacent region of the current block, the related blocks include adjacent blocks of the current block, and when the predetermined region includes a non-adjacent region of the current block, the related blocks include non-adjacent blocks of the current block. It should be noted that not only adjacent blocks have a spatial correlation with the current block, but nearby non-adjacent blocks also have a spatial correlation with the current block. This is also easily understandable, as all contents in the predetermined region are correlated. That is, in addition to using spatially adjacent blocks, nearby non-adjacent blocks can also be used, or both adjacent blocks and non-adjacent blocks are used, so as to select a context for the current block with reference to a sufficient number of related blocks. In this way, more related blocks are selected for the current block by setting a larger predetermined region, so that a spatial correlation between picture blocks is fully utilized, and a more suitable context is matched for a first syntax element of the current block according to more related blocks, preventing an accidental event from affecting selection of the context. As an extreme example, mode 1 is used in a large part of regions around the current block, but mode 2 is selected in certain adjacent blocks. If these certain adjacent blocks happen to be selected for determining a context of the current block, the current block would not know that mode 1 is selected in many related regions, thereby affecting mode selection of the current block.

Specifically, it is possible to select a plurality of adjacent blocks as related blocks of the current block, a plurality of non-adjacent blocks as related blocks of the current block, or a plurality of adjacent blocks as well as a plurality of non-adjacent blocks as related blocks of the current block.

Figure 6:
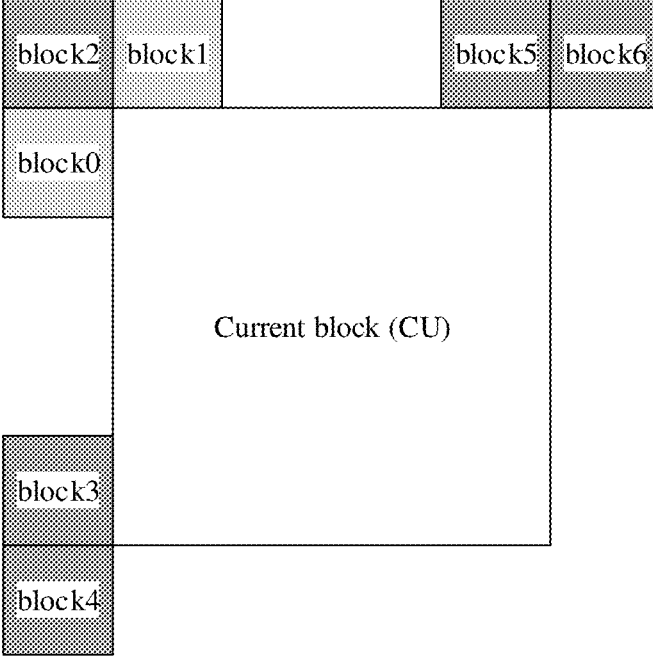
FIG. 6 is a third schematic diagram of selection positions of related blocks in an embodiment of the present application.

FIG. 6 is a third schematic diagram of selection positions of related blocks in an embodiment of the present application. For adjacent blocks, in addition to left adjacent blocks and upper adjacent blocks, adjacent blocks determined in other positions may also be used. In an example shown in FIG. 6, the current block is a block including coordinates (x0, y0). In an example where the coordinates (x0, y0) are the coordinates of the upper left corner of the current block, block0 is an adjacent block including coordinates (x0−1, y0), block1 is an adjacent block including coordinates (x0, y0−1), block2 is an adjacent block including coordinates (x0−1, y0−1), block3 is an adjacent block including coordinates (x0−1, y0+cbHeight−1), block4 is an adjacent block including coordinates (x0−1, y0+cbHeight), block5 is an adjacent block including coordinates (x0+cbWidth−1, y0−1), and block6 is an adjacent block including coordinates (x0+cbWidth, y0−1), where (x0, y0) are the coordinates of the upper left corner of the current block, cbWidth is a width of the current block, and cbHeight is a height of the current block.

Figure 7:
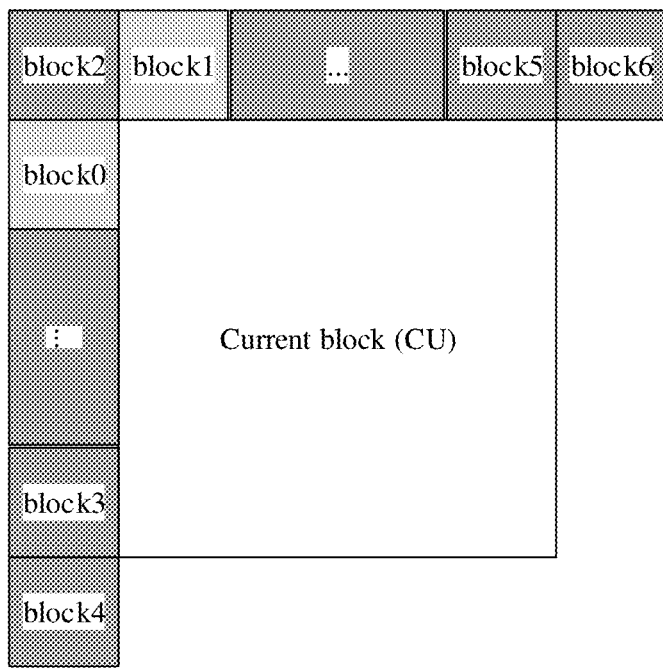
FIG. 7 is a fourth schematic diagram of selection positions of related blocks in an embodiment of the present application.

FIG. 7 is a fourth schematic diagram of selection positions of related blocks in an embodiment of the present application. Further, more spatially adjacent blocks may be used. That is, in addition to selecting the adjacent blocks from the seven adjacent blocks shown in FIG. 6, one or more adjacent blocks between block1 and block5 (i.e., the region indicated by " . . . ") in FIG. 7 and one or more adjacent blocks between block0 and block3 (i.e., the region indicated by " . . . ") in FIG. 7 may further be selected for determining a context of the syntax element of the current block.

Figure 8:
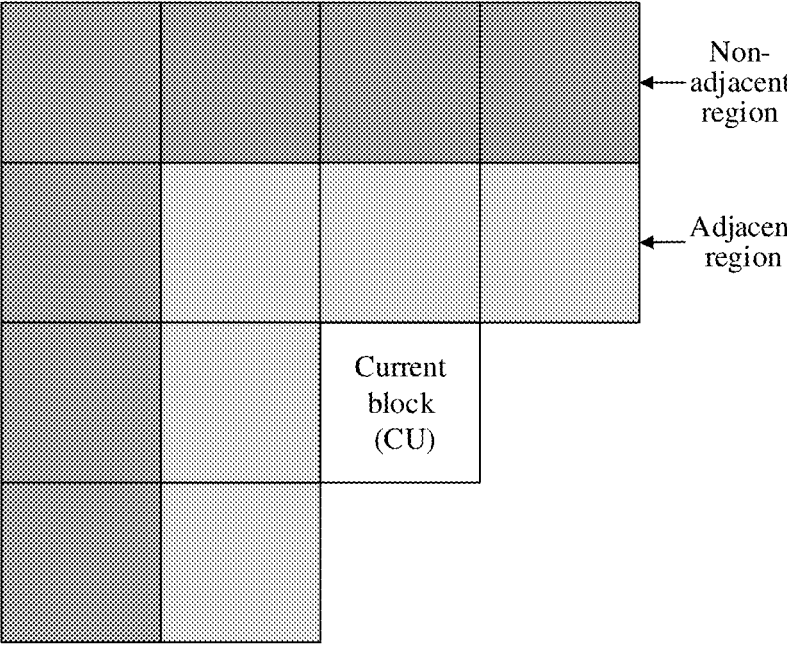
FIG. 8 is a fifth schematic diagram of selection positions of related blocks in an embodiment of the present application.

FIG. 8 is a fifth schematic diagram of selection positions of related blocks in an embodiment of the present application. Further, more spatially non-adjacent blocks may be used. As shown in FIG. 8, related blocks may be selected from non-adjacent regions, or related blocks may be selected from both non-adjacent regions and adjacent regions, and the selection positions of the related blocks may be preset.

In a specific implementation, the predetermined region may be determined by setting a search range and a search condition, for example, setting a variable searchRange, setting the search range to a range where the abscissa ranges from x0−searchRange to x0+searchRange and the ordinate ranges from y0−searchRange to y0+searchRange, and setting the search condition to an encoded block, where (x0, y0) are the coordinates of the upper left corner of the current block. Encoded blocks are searched for in the predetermined region as related blocks of the current block. That is, the predetermined region may include an encoded region and may also include an uncoded region.

In actual application, strengths of correlation between related blocks and the current block are the same or different. Exemplarily, the method further includes operations that: weights are configured for the related blocks according to the strengths of correlation between the related blocks and the current block; and a context index parameter is determined based on the weights of the related blocks and information of the related block. For example, for adjacent blocks, the closer an adjacent block to the upper left corner of the current block, the stronger the correlation, and the farther, the weaker. For adjacent blocks and non-adjacent blocks, the closer an adjacent block and a non-adjacent block to the current block, the stronger the correlation, and the farther, the weaker. If non-adjacent blocks are used as the related blocks, an approach is to set different weights for the non-adjacent blocks. In this way, the strength of the spatial correlation is considered, and the accuracy of selection of the context can be further improved by setting the weights of the related blocks.

In some embodiments, the method further includes an operation that weights are configured for the related blocks based on distances between the related blocks and the current block. In actual application, the distance may be a lateral distance, a longitudinal distance, or a straight-line distance.

In some embodiments, the method further includes an operation that weights are configured for the related blocks based on coordinates of the related blocks and coordinates of the current block.

In some embodiments, the method further includes operations that: a first sub-region in which the related blocks are located is determined and weights are configured for the related blocks based on the first sub-region in which the related blocks are located. Herein, the first sub-region is at least one of at least two second sub-regions comprised in the predetermined region.

Specifically, the method further includes operations that: the predetermined region is divided into at least two second sub-regions and a weight is configured for each second sub-region.

Exemplarily, the operation that the weights of the related blocks are configured based on the first sub-region in which the related blocks are located includes operations that: when the first sub-region includes two or more second sub-regions, a fusion operation is performed on the weights of the second sub-regions to acquire a weight of the first sub-region; and the weights of the related blocks are configured to be the weight of the first sub-region. Exemplarily, the fusion operation may be a weighting operation, an averaging operation, and the like.

Exemplarily, the operation that the weights of the related blocks are configured based on the first sub-region in which the related blocks are located includes operations that: when the first sub-region includes one second sub-region, the weight of the first sub-region is configured to be the weight of the second sub-region and the weights of the related blocks are configured to be the weight of the first sub-region. That is, the weights of the related blocks are configured to be the weight of the second sub-region.

Exemplarily, the predetermined region may be divided into at least two sub-regions by using at least two concentric rings. Specifically, position information of each ring is preset, and it is determined, according to position information of a related block x, that position information of an Li-th ring matches the position information of the related block x and that the related block X is located in the Li-th ring.

Here, the wording "position information matches" may be that the position information of the Li-th ring includes the position information of the related block x, or that a distance between the Li-th ring and the related block x is less than a preset distance threshold.

Figure 9:
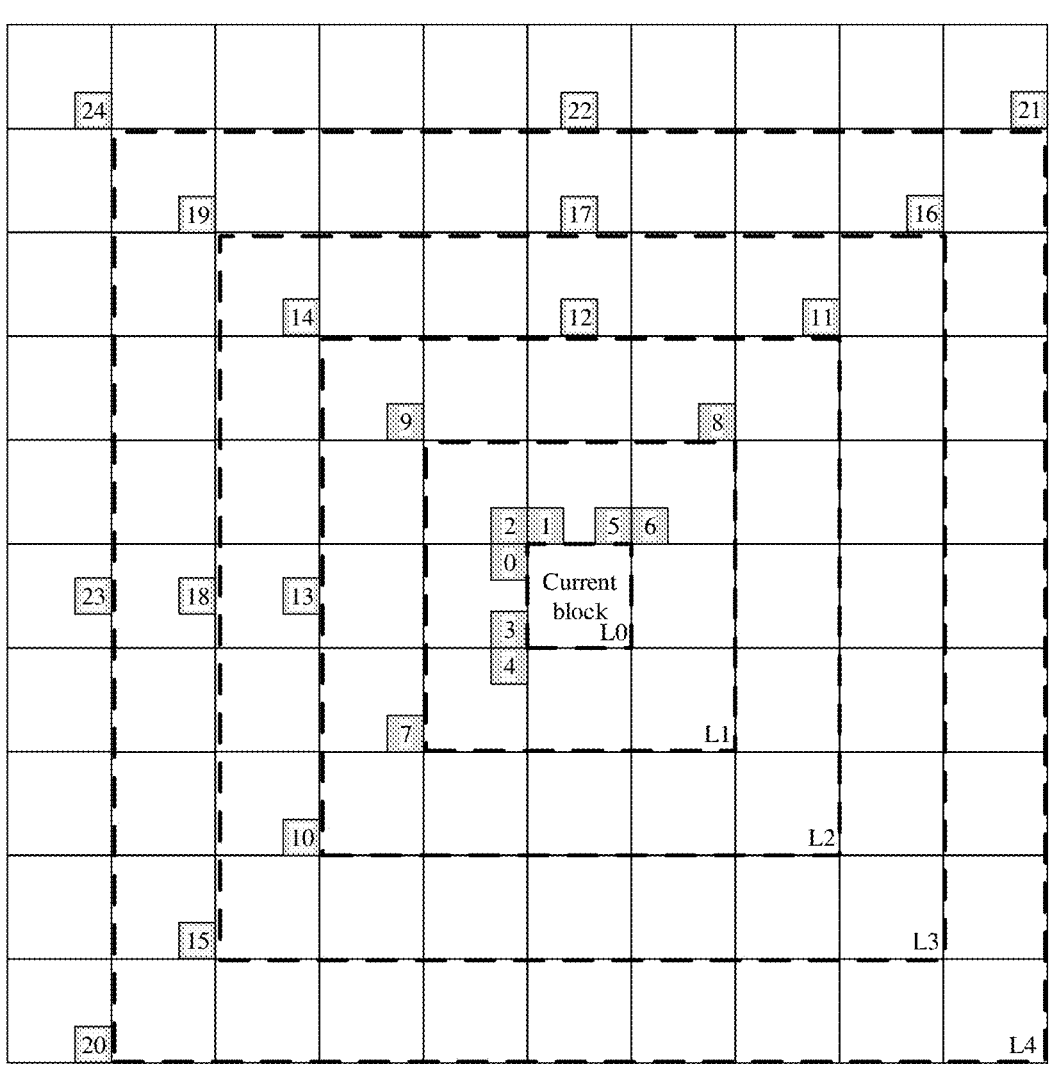
FIG. 9 is a sixth schematic diagram of selection positions of related blocks in an embodiment of the present application.

FIG. 9 is a fifth schematic diagram of selection positions of related blocks in an embodiment of the present application, where 0 to 6 are adjacent blocks, and blocks with numbers greater than 6 are non-adjacent blocks. A method for locating these blocks is to configure an interval of the concentric rings by using the size of the current block as an interval length, so as to set the position information of each ring. In the example shown in FIG. 9, concentric rings are represented by L0 to L4, and when the position information of the Li-th ring includes position information of a related block x, it is determined that the related block x is located in the Li-th ring. The position information of the related block x is coordinates. The position information of each ring includes coordinate information for describing a rectangular edge. The position information of each ring includes: a first abscissa and an ordinate value range corresponding thereto, a second abscissa and an ordinate value range corresponding thereto, a first ordinate and an abscissa value range corresponding thereto, and a second ordinate and an abscissa value range corresponding thereto. Four sides of each ring are surrounded and defined by two lines that are n*cbWidth away from the current block in a left-right direction together with two lines that are n*cbHeight away from the current block in an up-down direction. Thus, for example, block 9 in the figure is determined by coordinates (x0−cuWidth, y0−cuHeight), n corresponding to the first ring L1 is 1, and n corresponding to the second ring L2 is 2. Block 14 in the figure is determined by coordinates (x0−2*cuWidth, y0−2*cuHeight).

Exemplarily, the weight of the 0-th ring L0 is set to 1, that is, the weights of the adjacent blocks in the 0-th ring L0 are set to 1; the weight of the first ring L1 is set to $\frac{1}{2}$; the weight of the second ring L2 is set to $\frac{1}{4}$, the weight of the third ring L3 is set to $\frac{1}{8}$, the weight of the fourth ring L4 is set to $\frac{1}{16}$, and so on. It should be noted that, a weight setting method is provided here as merely an example, and is not intended to limit the present application. In actual application, different weights may be set for the same ring, or weights may be set with reference to video picture features.

In some embodiments, the operation that the plurality of coded related blocks corresponding to the current block are selected from a predetermined region includes operations that: coordinates of the related blocks are determined in the predetermined region based on coordinates of the current block; and the information of the related blocks is acquired based on the coordinates of the related blocks.

In some embodiments, the method further includes an operation that: the information of the related blocks is acquired based on a preset selection order and the coordinates of the related blocks.

Here, the coordinates are used to locate the current block and the related blocks. The coordinates may be at least one of the following: coordinates of the upper left corner of the block, coordinates of the lower left corner of the block, coordinates of the upper right corner of the block, coordinates of the lower right corner of the block, coordinates of the center of the block, etc. The selection order is used to set the temporal order of selection of a plurality of related blocks. For example, the selection order may be a search radiating from the inside to the outside with the current block as the center, or a search from left to right or from top to bottom in a search region according to a certain search granularity.

More related blocks can be found by using any one of the above methods. In the following, coded information of these related blocks is used to select a context for the first syntax element of the current block.

At operation 302, a context index parameter for a first syntax element of the current block is determined based on information of the plurality of related blocks.

Exemplarily, the value of a context index (ctxIdx) is equal to the sum of a context index increment (ctxInc) and a context index offset (ctxIdxOffset). It can be considered that ctxIdxOffset means to first divide contexts into different sets, and ctxInc means to select a certain context from a set.

Here, the information of the related blocks is used to indicate a context selected when a first syntax element of the related block is coded. Exemplarily, in some embodiments, the information of the related block include: a context index reference value of a first syntax element of the related block. In some other embodiments, the information of the related block further includes: an availability flag of the related block. The availability flag is used to indicate whether the context index reference value of the related block can be used to determine a context index reference value of the current block.

In some embodiments, the operation that a context index parameter for a first syntax element of the current block is determined based on information of the plurality of related blocks includes operations that: a context index offset corresponding to the first syntax element is determined; a context index increment for the first syntax element of the current block is determined based on the information of the plurality of related blocks; the context index of the first syntax element is determined based on the context index increment and the context index offset; and the context index parameter is set to be equal to the context index.

It should be noted that, the current block includes a plurality of syntax elements. The first syntax element refers to one of the plurality of syntax elements of the current block. The context corresponding to the context index may be understood as the context corresponding to the first syntax element. Each syntax element corresponds to two or more contexts. When the first syntax element of the current block is coded, a matching context is selected for the first syntax element of the current block based on the same syntax element of the related block. In the embodiments of the present application, a more matching context may further be selected for a syntax element by increasing the number of contexts, thereby further improving compression efficiency.

Exemplarily, for syntax elements alf_ctb_flag[cIdx] [xCtb][yCtb], alf_ctb_cc_cb_idc[xCtb][yCtb], alf_ctb_cc_cr_idc[xCtb][yCtb], split_qt_flag,split_cu_flag, cu_skip_ flag[x0][y0], pred_mode_ibc_flag[x0][y0], intra_mip_flag, inter_affine_flag[x0][y0], and merge_subblock_flag[x0] [y0], there are three contexts in VVC, or one set includes three contexts. For syntax elements pred_mode_flag[x0][y0] and non_inter_flag, there are two contexts in VVC.

Exemplarily, in some embodiments, the method further includes operations that: a first context list used when selecting a context for the first syntax element is determined; and the context index parameter is set to be an index of the first context list.

When a plurality of context lists are preset to map contexts, each context list includes a plurality of contexts.

ctxTable is used for representing a context list used when selecting a context, and ctxIdx is used for indexing a certain context in the context list.

When different syntax elements are parsed, it is necessary to use a context corresponding to a respective syntax element, that is, corresponding ctxTable and ctxIdx. Table 1 defines corresponding ctxTable that can be found in this table for any syntax element coded by using the context. ctxIdxOffset is the smallest value of ctxIdx in the current initType in Table 1. initType is related to the slice type (I slice, P slice, or B slice) and also related to some flags, which will not be described in detail here. It can be considered that ctxIdxOffset means to first divide contexts into different sets, and ctxInc means to select a certain context from a set.

Exemplarily, in Table 1, the index of the first context list corresponding to syntax element alf_ctb_flag[ ][ ][ ] is Table 52, and the index of the first context list corresponding to syntax element alf_use_aps_flag is Table 53.

TABLE 1

| Syntax | | | initType | | |
|---|---|---|---|---|---|
| Structure | Syntax Element | ctxTable | 0 | 1 | 2 |
| coding_ | alf_ctb_flag[ ][ ][ ] | Table 52 | 0 . . . 8 | 9 . . . 17 | 18 . . . 26 |
| tree_ | alf_use_aps_flag | Table 53 | 0 | 1 | 2 |
| unit( ) | alf_ctb_filter_ alt_idx[ ][ ][ ] | Table 56 | 0 . . . 1 | 2 . . . 3 | 4 . . . 5 |
| | alf_ctb_cc_cb_idc[ ][ ] | Table 54 | 0 . . . 2 | 3 . . . 5 | 6 . . . 8 |
| | alf_ctb_cc_cr_idc[ ][ ] | Table 55 | 0 . . . 2 | 3 . . . 5 | 6 . . . 8 |

At operation 303, the first syntax element of the current block is coded based on a context corresponding to the context index parameter.

It should be noted that a syntax element may have one or more bins, while a flag typically has only one bin because a flag usually has only two options. Each bin may have one or more contexts, that is, each bin may correspond to one or more ctxIdx. When the bin has a plurality of contexts, it is necessary to select the most matching context from the plurality of contexts for coding, thereby improving coding efficiency. In the embodiments of the present application, the context is selected on the premise that the bin is coded using a context. In the embodiments of the present application, unless otherwise specified, the bin refers to a bin coded by a context.

The method for determining the context index increment is further exemplified below.

The syntax element of the related block refers to a coded syntax element of the related block, and since the coding end includes coding and decoding processes, it is understandable that the coded syntax element may also referred to as a decoded syntax element.

In some embodiments, the operation that a context index increment for the first syntax element of the current block is determined based on the information of the plurality of related blocks includes operations that: a first temporary value is determined based on the information of the plurality of related blocks; and conversion is performed on the first temporary value based on a preset conversion algorithm to acquire the context index increment for the first syntax element of the current block.

In some embodiments, the information of the related blocks include: an availability flag and a context index reference value of a first syntax element of each related block. The operation that a first temporary value is determined based on the information of the plurality of related blocks includes operations that: an AND operation is performed on the availability flag and the context index reference value of each related block to acquire an AND operation result; and the first temporary value is acquired based on the AND operation result of each related block.

Further, the first temporary value is converted into a matching context index increment by using a preset conversion algorithm. In some embodiments, the preset conversion algorithm includes at least one of the following: setting the first temporary value to be equal to the context index increment; dividing the first temporary value by a first reference value to acquire the context index increment; right-shifting the first temporary value by a second reference value to acquire the context index increment; and determining a first value range in which the first temporary value is located, and using an index increment corresponding to the first value range as the context index increment.

Exemplarily, a format of VVC is used as an example, and the context index reference value may be represented by a determination condition for selecting the context. In the embodiments of the present application, availableN is used for indicating whether the N-th related block is available, and for the determination condition, conditionN (condN for short) is used to represent a determination condition of the N-th related block corresponding to the first syntax element.

Exemplarily, the first temporary value (tempValue) is set, and tempValue is initialized to 0. The coded syntax elements of the x-th related block are availablex and condx, where x ranges from 0 to N. The following operation is performed from x=0 to x=N: tempValue+=availablex&&condx. In the example shown in FIG. 6, N is 6, and may be changed to a corresponding value when a different number of related blocks are used. tempValue can be understood as an intermediate variable in an accumulation process, and when x=N, tempValue is the first temporary value that is finally acquired.

Specifically, the coordinates (xCurr, yCurr) of the current block are set to (x0, y0), and the coordinates (xNbL, yNbL) of the left adjacent block are set to (x0−1, y0). Whether the left adjacent block is available is derived from (xNbL, yNbL), (x0, y0), and cIdx, and a result is assigned to availableL. availableL indicates whether the left adjacent block is available.

The coordinates (xNbA, yNbA) of the upper adjacent block are set to (x0, y0−1). Whether the upper adjacent block is available is derived from (xNbA, yNbA), (x0, y0), and cIdx, and a result is assigned to availableA. availableA indicates whether the upper adjacent block is available.

The coordinates (xNbN, yNbN) of the N-th related block are set to (x0−Nx, y0−Ny). Whether the N-th related is available is derived from (x0−Nx, y0−Ny), (x0, y0), and cIdx, where the coordinates (xCurr, yCurr) of the current block are input as cIdx, and a result is assigned to availableN. availableN indicates whether the N-th related block is available.

Table 2 defines a specification for determining ctxInc for the syntax elements of the left adjacent block and the upper adjacent block. The determination conditions of the left adjacent block and the upper adjacent block corresponding to each syntax element are defined in Table 2. It should be noted that, in the embodiments of the present application, other related blocks are further used in addition to the left adjacent block and the upper adjacent block. That is, a sufficient number of related blocks having a spatial correlation with the current block are used for context selection, and it is necessary to add determination conditions (condN) of more related blocks in addition to that in Table 2. If there are a plurality of corresponding context sets, it is also necessary to add context set indexes (ctxSetIdx).

In a possible implementation, the first syntax element is coded, and when it is determined that the related block is available, the determination condition of the related block is determined by looking up the table. When it is determined that the related block is unavailable, it is not necessary to acquire the determination condition of the related block.

TABLE 2

| Syntaxelement (Syntax Element) | condL (Left adjacent Block) | condA (Upper adjacent Block) | ctxSetIdx |
|---|---|---|---|
| alf_ctb_flag[cIdx] [xCtb][yCtb] | alf_ctb_flag[cIdx] [xCtbL][yCtbL] | alf_ctb_flag[cIdx] [xCtbA][yCtbA] | cIdx |
| alf_ctb_cc_cb_idc [xCtb][yCtb] | alf_ctb_cc_cb_idc [xCtbL][yCtbL] | alf_ctb_cc_cb_idc [xCtbA][yCtbA] | 0 |
| alf_ctb_cc_cr_idc [xCtb][yCtb] | alf_ctb_cc_cr_idc [xCtbL][yCtbL] | alf_ctb_cc_cr_idc [xCtbA][yCtbA] | 0 |
| split_qt_flag | CqtDepth[chType] [xNbL][yNbL] > cqtDepth | CqtDepth[chType] [xNbA][yNbA] > cqtDepth | cqtDepth >= 2 |
| split_cu_flag | CbHeight[chType] [xNbL][yNbL] < cbHeight | CbWidth[chType] [xNbA][yNbA] < cbWidth | (allowSplitBtVer + allowSplitBtHor + allowSplitTtVer + allowSplitTtHor + 2*allowSplitQt − 1)/2 |
| non_inter_flag | CuPredMode[chType] [xNbL][yNbL] == MODE_INTRA | CuPredMode [chType] [xNbA][yNbA] == MODE_INTRA | 0 |
| cu_skip_flag[x0][y0] | CuSkipFlag[xNbL] [yNbL] | CuSkipFlag[xNbA] [yNbA] | 0 |
| pred_mode_flag[x0] [y0] | CuPredMode[chType] [xNbL][yNbL] == MODE_INTRA | CuPredMode [chType] [xNbA][yNbA] == MODE_INTRA | 0 |
| pred_mode_ibc_flag [x0][y0] | CuPredMode[chType] [xNbL][yNbL] == MODE_IBC | CuPredMode[chType] [xNbA][yNbA] == MODE_IBC | 0 |
| intra_mip_flag | IntraMipFlag[xNbL] [yNbL] | IntraMipFlag[xNbA] [yNbA] | 0 |

TABLE 2-continued

| Syntaxelement (Syntax Element) | condL (Left adjacent Block) | condA (Upper adjacent Block) | ctxSetIdx |
|---|---|---|---|
| merge_subblock_flag [x0][y0] | MergeSubblockFlag [xNbL][yNbL] \|\|InterAffineFlag [xNbL][yNbL] | MergeSubblockFlag [xNbA][yNbA] \|\|InterAffi neFlag[xNbA][yNbA] | 0 |
| inter_affine_flag[x0] [y0] | MergeSubblockFlag [xNbL][yNbL] \|\|InterAffineFlag [xNbL][yNbL] | MergeSubblockFlag [xNbA][yNbA] \|\|InterAffineFlag [xNbA][yNbA] | 0 | ctxInc is then matched. A possible method is ctxInc=tempValue. Alternatively, ctxInc=tempValue/M1, where M1 is an integer. For example, M1 is configured to be 1, 2, 3, 4, or 5 according to the context. Alternatively, ctxInc=tempValue>>M2, where >> represents right-shifting, because the cost of right-shifting is much less than that of a division in hardware implementation. Alternatively, ctxInc is written as ctxInc=tempValue<THR0?0: (tempValue<THR1?1:2). THR0 and THR1 are thresholds, and the two thresholds are used to divide the tempValue into three value ranges, that is, tempValue<THR0, THR0≤tempValue<THR1, and THR1≤tempValue. In actual application, one threshold may be used to divide tempValue into two value ranges, or a plurality of thresholds may be used to divide tempValue into more value ranges.

In some embodiments, the information of the related blocks include: an availability flag and a context index reference value of a first syntax element of each related block, and the operation that a first temporary value is determined based on the information of the plurality of related blocks includes operations that: weights of the plurality of related blocks are acquired; an AND operation is performed on the availability flag and the context index reference value of each related block to acquire an AND operation result; a weighting operation is performed on the AND operation result of each related block based on the weights of the plurality of related blocks; and the first temporary value is acquired based on a weighting result of each related block.

In actual application, the first temporary value is acquired by performing a summation operation on the weighting results, or performing an OR operation on the weighting results, or performing an AND operation on the weighting results, or the like.

Exemplarily, the first temporary value (tempValue) is set, and tempValue is initialized to 0. The coded syntax elements of the x-th related block are availablex and condx, where x ranges from 0 to N. The following operation is performed from x=0 to x=N: tempValue+=(availablex&&condx) *weightx. In the example shown in FIG. 9, N is 24, and may be changed to a corresponding value when a different number of related blocks are used. weightx may be determined according to the position of the related block x, for example, by determining the ring in which the related block x is located as mentioned above.

Exemplarily, position information of each ring is preset, and it is determined, according to position information of the related block x, that the position information of the Li-th ring matches the position information of the related block x, so as to determine that the related block X is located in the Li-th ring. In the example shown in FIG. 9, when the position information of the Li-th ring includes the position information of the related block x, it is determined that the related block X is located in the Li-th ring. The position information of the related block x is coordinates. The position information of each ring includes coordinate information for describing a rectangular edge. The position information of each ring includes: a first abscissa and an ordinate value range corresponding thereto, a second abscissa and an ordinate value range corresponding thereto, a first ordinate and an abscissa value range corresponding thereto, and a second ordinate and an abscissa value range corresponding thereto.

ctxInc is then matched. A possible method is ctxInc=tempValue. Alternatively, ctxInc=tempValue/M1, where M1 is an integer. For example, M1 is configured to be 1, 2, 3, 4, or 5 according to the context. Alternatively, ctxInc=tempValue>>M2, where >> represents right-shifting, because the cost of right-shifting is much less than that of a division in hardware implementation. Alternatively, ctxInc is written as ctxInc=tempValue<THR0?0: (tempValue<THR1?1:2). THR0 and THR1 are thresholds, and the two thresholds are used to divide the tempValue into three value ranges, that is, tempValue<THR0, THR0≤tempValue<THR1, and THR1≤tempValue. In actual application, one threshold may be used to divide tempValue into two value ranges, or a plurality of thresholds may be used to divide tempValue into more value ranges.

In some embodiments, when the first syntax element corresponds to a plurality of context sets, the operation that a context index increment for the first syntax element of the current block is determined based on the information of the plurality of related blocks includes operations that: a first temporary value is determined based on the information of the plurality of related blocks; and a second temporary value is determined based on a context set index corresponding to the first syntax element and the number of contexts in each context set; conversion is performed on the first temporary value based on a preset conversion algorithm to acquire a third temporary value; and the context index increment for the first syntax element of the current block is acquired based on the second temporary value and the third temporary value.

That is, the syntax element may directly correspond to one or more contexts, or may correspond to one or more context sets, each context set includes a plurality of contexts. When the first syntax element corresponds to a plurality of context sets, the third temporary value is used for indexing a context in a certain context set. Therefore, it is further necessary to determine the second temporary value according to the context set index and the number of contexts. The second temporary value is used as an offset of the context set for indexing the first context in the context set. The context index increment is acquired by summing the second temporary value and the third temporary value and is used for determining a context in a context set.

Exemplarily, when a context set is set for some syntax elements, ctxInc+=ctxSetIdx*P, where ctxSetIdx is the index of the context set, ctxSetIdx may be 0, 1, 2, 3, and so on, P is the number of contexts in the context set, and P may be 2, 3, 4, 5, and so on.

Exemplarily, for syntax elements alf_ctb_flag[cIdx][xCtb][yCtb], alf_ctb_cc_cb_idc[xCtb][yCtb], alf_ctb_cc_cr_idc[xCtb][yCtb], split_qt_flag,split_cu_flag, cu_skip_flag[x0][y0], pred_mode_ibc_flag[x0][y0], intra_mip_flag, inter_affine_flag[x0][y0], and merge_subblock_flag[x0][y0], there are three context sets for VVC, and one set includes three contexts.

By using the above technical solution, more related blocks are selected for a current block by setting a larger predetermined region, so that a spatial correlation between picture blocks is fully utilized, and a more suitable context can be matched for a first syntax element of the current block, improving compression efficiency for syntax elements and accordingly improving the compression efficiency of the entire system.

The following description is provided as an example in which CABAC is used in VVC. Processing of CABAC mainly includes binarization, contexting, and binary arithmetic coding. Binarization refers to performing binarization processing on an input non-binary syntax element value to uniquely convert the same into a binary sequence (i.e., a binary string). Contexting refers to determining, for each bit in a binary string, a context of the bit according to context information (for example, coding information in a reconstructed region around a node corresponding to a syntax element). Binary arithmetic coding refers to coding a corresponding bit according to a probability value in a context, and updating the probability value in the context according to the value of the bit. In the embodiments of the present application, a context of each bit in a binary string of a first syntax element is selected, and a corresponding context is determined according to the determined context index.

After the context is determined, parameters of the context are used as inputs to invoke an arithmetic decoding process of a bin.

The inputs to the arithmetic decoding process of a bin are the parameters (ctxTable and ctxIdx) of the context, a bypass decoding flag (bypassFlag), and state variables ivlCurrRange and ivlOffset of an arithmetic decoding engine, and output of the process is the value of the bin.

Figure 10:
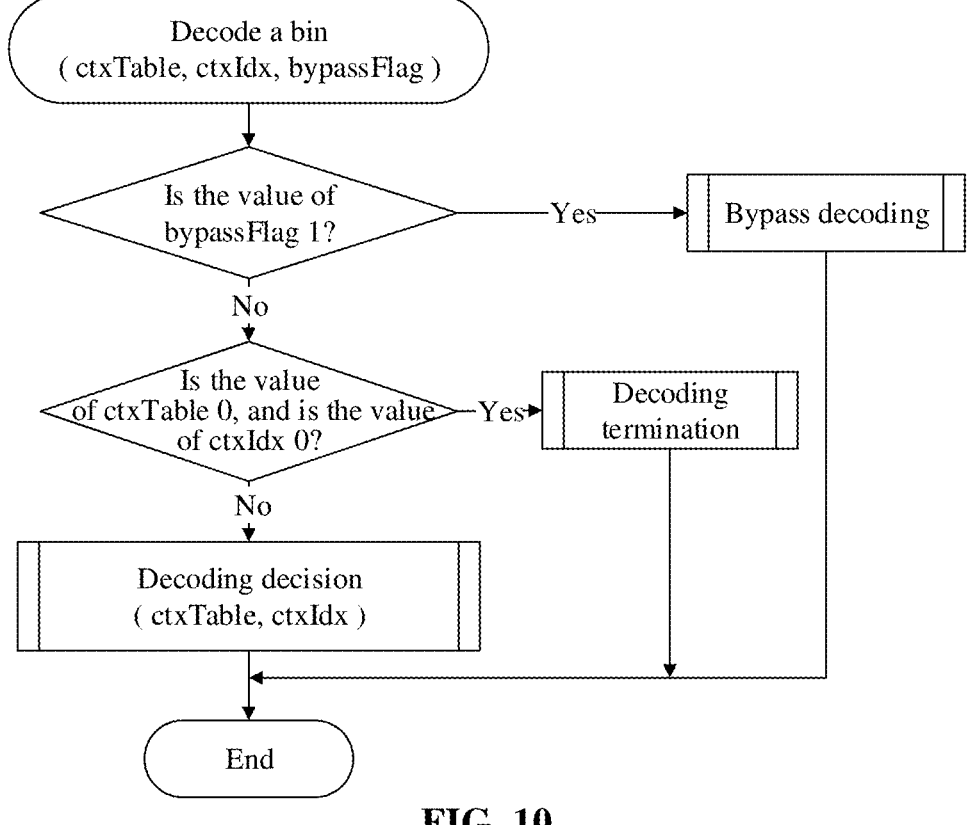
FIG. 10 is the entire arithmetic decoding process of a bin in an embodiment of the present application.

FIG. 10 is the whole arithmetic decoding process for a bin in an embodiment of the present application. For decoding the value of the bin, ctxTable, ctxIdx, and bypassFlag are passed as inputs to a bin decoding portion DecodeBin (ctxTable, ctxIdx, bypassFlag). The details are as follows:

if bypassFlag is equal to 1, bypass decoding DecodeBypass ( ) is invoked;

if bypassFlag is equal to 0, ctxTable is equal to 0, and ctxIdx is equal to 0, decoding termination Decode Terminate ( ) is invoked;

if bypassFlag is equal to 0 and ctxTable is not equal to 0, decoding decision DecodeDecision (ctxTable, ctxIdx) is invoked.

Figure 11:
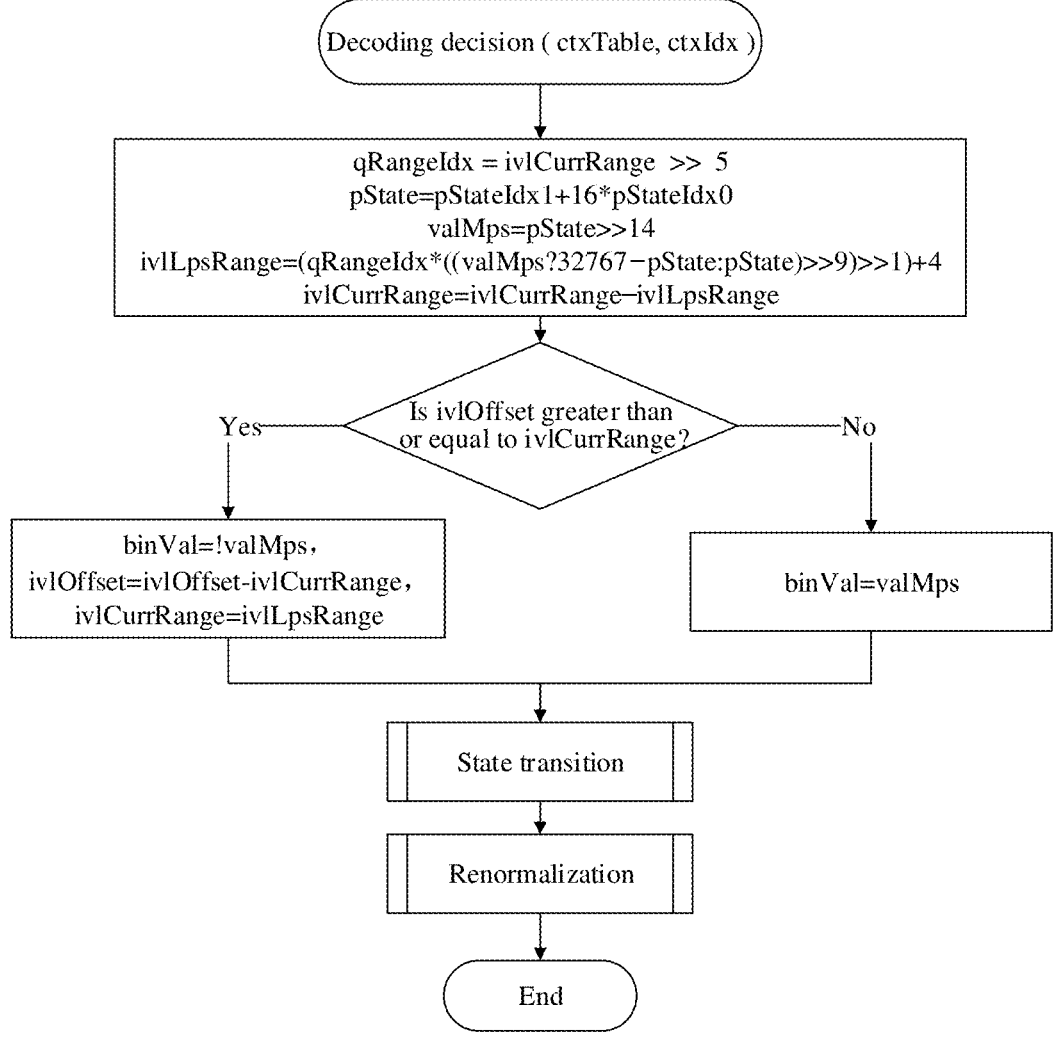
FIG. 11 is a decoding decision process of a bin in an embodiment of the present application.

FIG. 11 is a decoding decision process of a bin in an embodiment of the present application. Inputs to the decoding decision DecodeDecision (ctxTable, ctxIdx) process are variables ctxTable, ctxIdx, ivlCurrRange, and ivlOffset, and outputs of the process are a decoded value binVal and the updated variables ivlCurrRange and ivlOffset.

1. The value of a variable ivlLpsRange is derived as follows:

Given a current value of ivlCurrRange, a variable qRangeIdx is derived as follows:

$$qRangeIdx = ivlCurrRange \gg 5$$

Given qRangeIdx, and pStateIdx0 and pStateIdx1 corresponding to ctxTable and ctxIdx, where ctxTable is a table used when selecting a context mode, ctxIdx is a context index, and pStateIdx0 and pStateIdx1 are two states of a current context, valMps and ivlLpsRange are derived as follows:

$$pState = pStateIdx1 + 16 * pStateIdx0$$

$$valMps = pState \gg 14$$

$$ivlLpsRange = (qRangeIdx * ((valMps?32767 - pState : pState) \gg 9) \gg 1) + 4$$

2. The variable ivlCurrRange is set equal to ivlCurrRange−ivlLpsRange, and the following operations are performed:

If ivlOffset is greater than or equal to ivlCurrRange, the value of the variable binVal is 1−valMps, ivlOffset is decremented by ivlCurrRange, and ivlCurrRange is equal to ivlLpsRange;

otherwise, the variable binVal is equal to valMps.

Given the value of binVal, state transition is performed. Based on the current value of ivlCurrRange, renormalization is performed.

For the state transition process, inputs to the process are current pStateIdx0 and pStateIdx1, and the decoded value binVal. Outputs of the process are the updated context variables pStateIdx0 and pStateIdx1 corresponding to ctxTable and ctxIdx.

The variables shift0 and shift1 are derived from shiftIdx, and shiftIdx is determined by correspondence relationships between shiftIdx and ctxTable and ctxIdx.

$$shift0 = (shiftIdx) \gg 2) + 2$$

$$shift1 = (shiftIdx \& 3) + 3 + shift0$$

Based on the decoded value binVal, the two variables pStateIdx0 and pStateIdx1 corresponding to ctxTable and ctxIdx are updated as follows:

$$pStateIdx0 = pStateIdx0 - (pStateIdx0 \gg shift0) + (1023 * binVal \gg shift0)$$

$$pStateIdx1 = pStateIdx1 - (pStateIdx1 \gg shift1) + (16383 * binVal \gg shift1)$$

Figure 12:
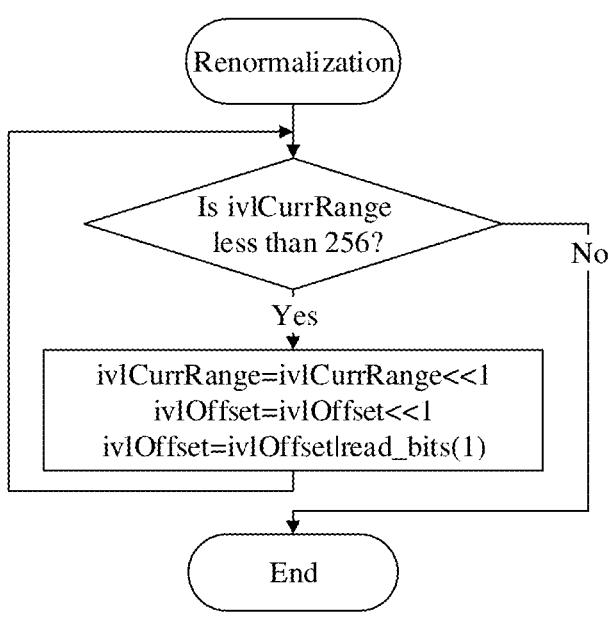
FIG. 12 is a renormalization process in an embodiment of the present application.

FIG. 12 is a renormalization process in an embodiment of the present application. Inputs to the process are bits in slice data and the variables ivlCurrRange and ivlOffset. Outputs of the process are the updated variables ivlCurrRange and ivlOffset.

The current value of ivlCurrRange is first compared with 256, and the subsequent steps are described as follows:

if ivlCurrRange is greater than or equal to 256, no renormalization is required, and the renormalization process ends;

otherwise (ivlCurrRange is less than 256), a renormalization loop is entered. In this loop, the value of ivlCurrRange is multiplied by 2, i.e., left-shifted by one bit. The value of ivlOffset is multiplied by 2, i.e., left-shifted by one bit. One bit acquired via read_bits (1) is shifted into ivlOffset.

Data in the bitstream should not cause ivlOffset to be greater than or equal to ivlCurrRange throughout the process.

Figure 13:
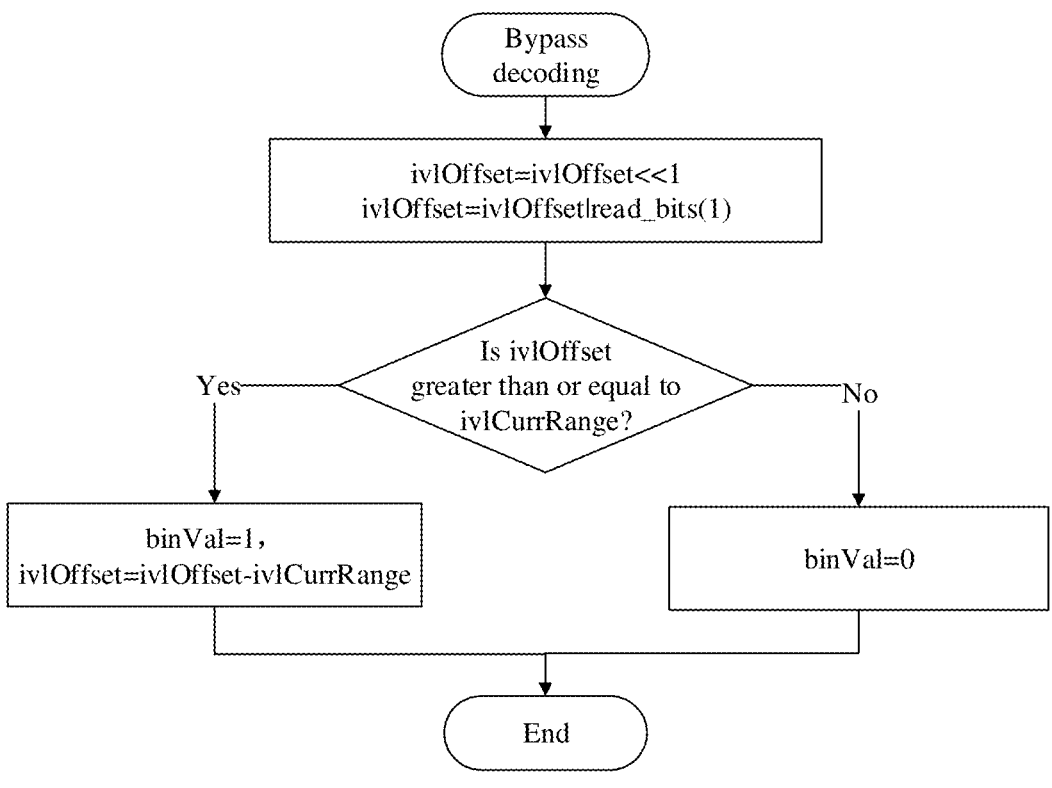
FIG. 13 is a bypass decoding process of a bin in an embodiment of the present application.

FIG. 13 is a bypass decoding DecodeBypass ( ) process of a bin in an embodiment of the present application. Inputs to the process are bits from slice data and the variables ivlCurrRange and ivlOffset. Outputs of the process are the updated variable ivl Offset and the decoded value binVal.

When bypassFlag is equal to 1, the bypass decoding process is invoked, and the bypass decoding process is as follows:

First, the value of ivlOffset is multiplied by 2, i.e., left-shifted by one bit. One bit acquired via read_bits (1) is shifted into ivlOffset. Then, the value of ivlOffset is compared with the value of ivlCurrRange, and the subsequent steps are as follows:

If ivlOffset is greater than or equal to ivlCurrRange, the value of binVal is set to 1, and ivlOffset is decremented by ivlCurrRange.

Otherwise (ivlOffset is less than ivlCurrRange), the value of binVal is set to 0.

Data in the bitstream should not cause ivlOffset to be greater than or equal to ivlCurrRange throughout the process.

Figure 14:
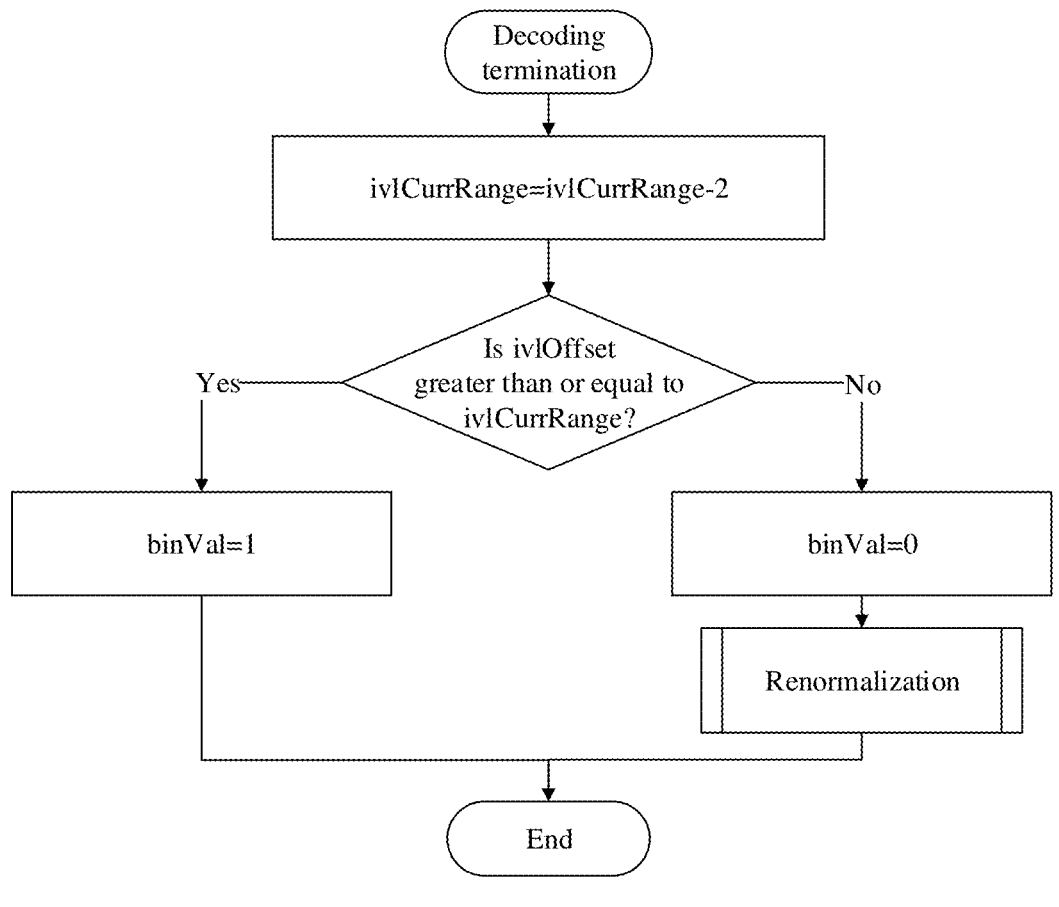
FIG. 14 is a decoding terminate process in an embodiment of the present application.

FIG. 14 is a decoding termination DecodeTerminate ( ) process in an embodiment of the present application. Inputs to the process are bits in slice data and the variables ivlCurrRange and ivlOffsel. Outputs of the process are updated ivlCurrRange and ivlOffsel, and the decoded value binVal.

First, the value of ivlCurrRange is decremented by 2.

If ivlOffset is greater than or equal to ivlCurrRange, the value of binVal is set to 1.

Otherwise (ivlOffset is less than ivlCurrRange), the value of binVal is set to 0, and the renormalization process is performed.

Figure 15:
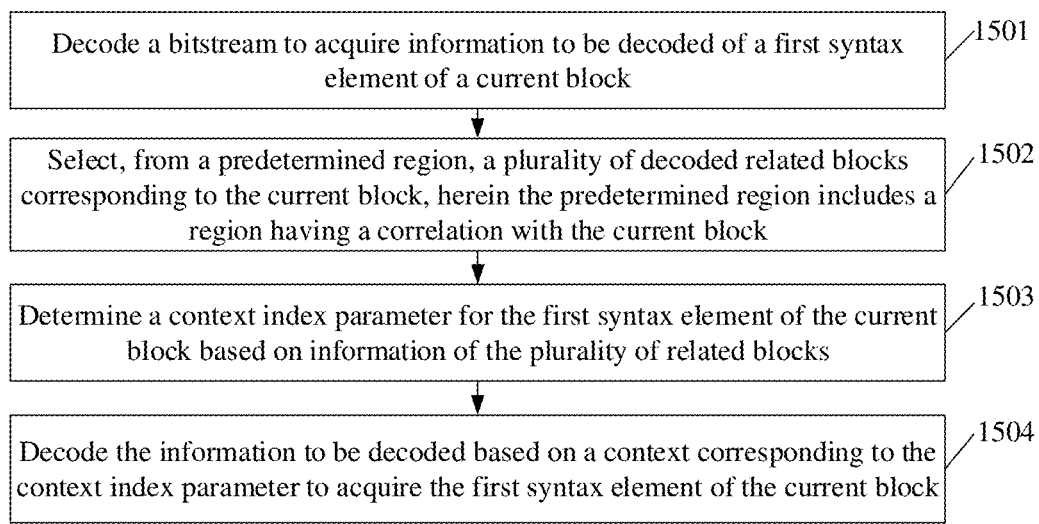
FIG. 15 is a schematic flowchart of a decoding method provided in an embodiment of the present application.

The embodiments of the present application further provide a decoding method. FIG. 15 is a schematic flowchart of a decoding method provided in an embodiment of the present application, and the method is applied to a decoder. As shown in FIG. 15, the method includes the following operations.

At operation 1501, a bitstream is decoded to acquire information to be decoded of a first syntax element of a current block.

At operation 1502, a plurality of decoded related blocks corresponding to the current block is selected from a predetermined region, herein the predetermined region includes a region having a correlation with the current block.

In the embodiments of the present application, the plurality of related blocks refer to at least three related blocks. The related blocks may be understood as picture blocks having a spatial correlation with the current block and used for determining a context of a syntax element of the current block. The decoded related blocks may also be understood as reconstructed blocks that are reconstructed at the decoding end.

In actual application, due to the picture block partition manner, the size of a related block may be the same as or different from the size of the current block. FIG. 4 is a first schematic diagram of selection positions of related blocks in an embodiment of the present application. As shown in FIG. 4, the related blocks include a left adjacent block, an upper adjacent block, and an upper left adjacent block of the current block, and the size of each related block is the same as the size of the current block. FIG. 5 is a second schematic diagram of selection positions of related blocks in an embodiment of the present application. As shown in FIG. 5, the related blocks include a left adjacent block, an upper adjacent block, and an upper left adjacent block of the current block, and the size of each related block is different from the size of the current block.

In some embodiments, the predetermined region includes an adjacent region of the current block and/or a non-adjacent region of the current block. When the predetermined region includes an adjacent region of the current block, the related blocks include adjacent blocks of the current block, and when the predetermined region includes a non-adjacent region of the current block, the related blocks include non-adjacent blocks of the current block. It should be noted that not only adjacent blocks have a spatial correlation with the current block, but nearby non-adjacent blocks also have a spatial correlation with the current block. This is also easily understandable, as all contents in the predetermined region are correlated. That is, in addition to using spatially adjacent blocks, nearby non-adjacent blocks can also be used, or both adjacent blocks and non-adjacent blocks are used, so as to select a context for the current block with reference to a sufficient number of related blocks. In this way, more related blocks are selected for the current block by setting a larger predetermined region, so that a spatial correlation between picture blocks is fully utilized, and a more suitable context is matched for a first syntax element of the current block according to more related blocks, preventing an accidental event from affecting selection of the context.

Specifically, it is possible to select a plurality of adjacent blocks as related blocks of the current block, a plurality of non-adjacent blocks as related blocks of the current block, or a plurality of adjacent blocks as well as a plurality of non-adjacent blocks as related blocks of the current block, as shown in FIG. 6 to FIG. 8.

In actual application, strengths of correlation between related blocks and the current block are the same or different. Exemplarily, the method further includes: weights are configured for the related blocks according to strengths of correlation between the related blocks and the current block; and a context index parameter determined based on the weights of the related blocks and information of the related blocks. For example, for adjacent blocks, the closer an adjacent block to the upper left corner of the current block, the stronger the correlation, and the farther, the weaker. For adjacent blocks and non-adjacent blocks, the closer an adjacent block and a non-adjacent block to the current block, the stronger the correlation, and the farther, the weaker. If non-adjacent blocks are used as the related blocks, an approach is to set different weights for the non-adjacent blocks. In this way, the strength of the spatial correlation is considered, and the accuracy of selection of the context can be further improved by setting the weights of the related blocks.

In some embodiments, the method further includes an operation that: weights are configured for the related blocks based on distances between related blocks and the current block. In actual application, the distance may be a lateral distance, a longitudinal distance, or a straight-line distance.

In some embodiments, the method further includes an operation that: weights are configured for the related blocks based on coordinates of the related blocks and coordinates of the current block.

In some embodiments, the method further includes operations that: a first sub-region in which the related blocks are located is determined and weights are configured for the related blocks based on the first sub-region in which the related blocks are located. Herein the first sub-region is at least one of at least two second sub-regions comprised in the predetermined region.

Specifically, the method further includes operations that: the predetermined region is divided into at least two second sub-regions; and a weight configured for each second sub-region.

Exemplarily, the operation that the weights of the related blocks are configured based on the first sub-region in which each related block is located includes operations that: when the first sub-region includes two or more second sub-regions, a fusion operation is performed on the weights of the second sub-regions to acquire a weight of the first sub-region; and the weights of the related blocks are configured to be the weight of the first sub-region. Exemplarily, the fusion operation may be a weighting operation, an averaging operation, and the like.

Exemplarily, the operation that the weights of the related blocks are configured based on the first sub-region in which each related blocks are located includes operations that: when the first sub-region includes one second sub-region, the weight of the first sub-region is configured to be the weight of the second sub-region; and the weights of the related blocks are configured to be the weight of the first sub-region. That is, the weights of the related blocks are configured to be the weight of the second sub-region.

Exemplarily, the predetermined region may be divided into at least two sub-regions by using at least two concentric rings. Specifically, position information of each ring is preset, and it is determined, according to position information of a related block x, that position information of an Li-th ring matches the position information of the related block x and that the related block X is located in the Li-th ring.

Here, the wording "position information matches" may be that the position information of the Li-th ring includes the position information of the related block x, or that a distance between the Li-th ring and the related block x is less than a preset distance threshold.

FIG. 9 is a fifth schematic diagram of selection positions of related blocks in an embodiment of the present application, where 0 to 6 are adjacent blocks, and blocks with numbers greater than 6 are non-adjacent blocks. A method for locating these blocks is to configure an interval of the concentric rings by using the size of the current block as an interval length, so as to set the position information of each ring. In the example shown in FIG. 9, concentric rings are represented by L0 to L4, and when the position information of the Li-th ring includes position information of a related block x, it is determined that the related block x is located in the Li-th ring. The position information of the related block x is coordinates. The position information of each ring includes coordinate information for describing a rectangular edge. The position information of each ring includes: a first abscissa and an ordinate value range corresponding thereto, a second abscissa and an ordinate value range corresponding thereto, a first ordinate and an abscissa value range corresponding thereto, and a second ordinate and an abscissa value range corresponding thereto. Four sides of each ring are surrounded and defined by two lines that are n*cbWidth away from the current block in a left-right direction together with two lines that are n*cbHeight away from the current block in an up-down direction. Thus, for example, block 9 in the figure is determined by coordinates (x0−cuWidth, y0−cuHeight). n corresponding to the first ring L1 is 1, and n corresponding to the second ring L2 is 2. Block 14 in the figure is determined by coordinates (x0−2*cuWidth, y0−2*cuHeight).

Exemplarily, the weight of the 0-th ring L0 is set to 1, that is, the weights of the adjacent blocks in the 0-th ring L0 are set to 1; the weight of the first ring L1 is set to $\frac{1}{2}$; the weight of the second ring L2 is set to $\frac{1}{4}$, the weight of the third ring L3 is set to $\frac{1}{8}$, the weight of the fourth ring L4 is set to $\frac{1}{16}$, and so on. It should be noted that, a weight setting method is provided here as merely an example, and is not intended to limit the present application. In actual application, different weights may be set for the same ring, or weights may be set with reference to video picture features.

In some embodiments, the operation that the plurality of decoded related blocks corresponding to the current block are selected from the predetermined region includes operations that: coordinates of the related blocks are determined in the predetermined region based on coordinates of the current block; and the information of the related blocks are acquired based on the coordinates of the related blocks.

In some embodiments, the method further includes an operation that: the information of the related blocks is acquired based on a preset selection order and the coordinates of the related blocks.

Here, the coordinates are used to locate the current block and the related blocks. The coordinates may be at least one of the following: coordinates of the upper left corner of the block, coordinates of the lower left corner of the block, coordinates of the upper right corner of the block, coordinates of the lower right corner of the block, coordinates of the center of the block, etc. The selection order is used to set the temporal order of selection of a plurality of related blocks. For example, the selection order may be a search radiating from the inside to the outside with the current block as the center, or a search from left to right or from top to bottom in a search region according to a certain search granularity.

At operation 1503, a context index parameter for the first syntax element of the current block is determined based on information of the plurality of related blocks.

Exemplarily, the value of a context index (ctxIdx) is equal to the sum of a context index increment (ctxInc) and a context index offset (ctxIdxOffset). It can be considered that ctxIdxOffset means to first divide contexts into different sets, and ctxInc means to select a certain context in a set.

Here, the information of the related blocks is used to indicate a context selected when a first syntax element of the related block is coded. Exemplarily, in some embodiments, information of a related block include: a context index reference value of a first syntax element of the related block. In some other embodiments, the information of the related block further includes: an availability flag of the related block. The availability flag is used to indicate whether the context index reference value of the related block can be used to determine a context index reference value of the current block.

In some embodiments, the operation that a context index parameter for a first syntax element of the current block is determined based on information of the plurality of related blocks includes operations that: a context index offset corresponding to the first syntax element is determined; a context index increment for the first syntax element of the current block is determined based on the information of the plurality of related blocks; the context index for the first syntax element is determined based on the context index increment and the context index offset; and the context index parameter is set to be equal to the context index.

It should be noted that, the current block includes a plurality of syntax elements. The first syntax element refers to one of the plurality of syntax elements of the current block. The context corresponding to the context index may be understood as the context corresponding to the first syntax element. Each syntax element corresponds to two or more contexts. When the first syntax element of the current block is coded, a matching context is selected for the first syntax element of the current block based on the same syntax element of the related block. In the embodiments of the present application, a more matching context may further be selected for a syntax element by increasing the number of contexts, thereby further improving compression efficiency.

Exemplarily, for syntax elements alf_ctb_flag[cIdx][xCtb][yCtb], alf_ctb_cc_cb_idc[xCtb][yCtb], alf_ctb_cc_cr_idc[xCtb][yCtb], split_qt_flag,split_cu_flag, cu_skip_flag[x0][y0], pred_mode_ibc_flag[x0][y0], intra_mip_flag, inter_affine_flag[x0][y0], and merge_subblock_flag[x0][y0], there are three contexts in VVC, or one set includes three contexts. For syntax elements pred_mode_flag[x0][y0] and non_inter_flag, there are two contexts in VVC.

Exemplarily, in some embodiments, the method further includes operations that: a first context list used when selecting a context for the first syntax element is determined; and the context index parameter is set to be an index of the first context list.

When a plurality of context lists are preset to map contexts, each context list includes a plurality of contexts. ctxTable is used for representing a context list used when selecting a context, and ctxIdx is used for indexing a certain context in the context list.

When different syntax elements are parsed, it is necessary to use the context corresponding to a respective syntax element, that is, corresponding ctxTable and ctxIdx. Table 1 defines corresponding ctxTable that can be found in this table for any syntax element coded by using the context. ctxIdxOffset is the smallest value of ctxIdx in the current initType in Table 1. initType is related to the slice type (I slice, P slice, or B slice) and also related to some flags, which will not be described in detail here. It can be considered that ctxIdxOffset means to first divide contexts into different sets, and ctxInc means to select a certain context in a set.

At operation 1504, the information to be decoded is decoded based on a context corresponding to the context index parameter to acquire the first syntax element of the current block.

It should be noted that a syntax element may have one or more bins, while a flag typically has only one bin because a flag usually has only two options. Each bin may have one or more contexts, that is, may correspond to one or more ctxIdx. When the bin has a plurality of contexts, it is necessary to select a most matching context from the plurality of contexts for coding, thereby improving coding efficiency. In the embodiments of the present application, the context is selected on the premise that the bin is coded using a context. In the embodiments of the present application, unless otherwise specified, the bin refers to a bin coded by a context.

The method for determining the context index increment is further exemplified below.

The syntax element of the related block refers to a decoded syntax element of the related block. In some embodiments, the operation that a context index increment for the first syntax element of the current block is determined based on the information of the plurality of related blocks includes operations that: a first temporary value is determined based on the information of the plurality of related blocks; and conversion is performed on the first temporary value based on a preset conversion algorithm to acquire the context index increment for the first syntax element of the current block.

In some embodiments, the information of the related blocks include: an availability flag and a context index reference value of a first syntax element of each related block. The operation that a first temporary value is determined based on the information of the plurality of related blocks includes: an AND operation is performed on the availability flag and the context index reference value of each related block to acquire an AND operation result; and the first temporary value is acquired based on the AND operation result of each related block.

Further, the first temporary value is converted into a matching context index increment by using a preset conversion algorithm. In some embodiments, the preset conversion algorithm includes at least one of the following: setting the first temporary value to be equal to the context index increment; dividing the first temporary value by a first reference value to acquire the context index increment; right-shifting the first temporary value by a second reference value to acquire the context index increment; and determining a first value range in which the first temporary value is located, and using an index increment corresponding to the first value range as the context index increment.

Exemplarily, a format of VVC is used as an example, and the context index reference value may be represented by a determination condition for selecting the context. In the embodiments of the present application, availableN is used for indicating whether the N-th related block is available, and for the determination condition, conditionN (condN for short) is used to represent a determination condition of the N-th related block corresponding to the first syntax element.

Exemplarily, the first temporary value (tempValue) is set. tempValue is initialized to 0. The decoded syntax elements of the x-th related block are availablex and condx, where x ranges from 0 to N. The following operation is performed from x=0 to x=N: tempValue+=availablex&&condx. In the example shown in FIG. 6, N is 6, and may be changed to a corresponding value when a different number of related blocks are used. tempValue can be understood as an intermediate variable in an accumulation process, and when x=N, tempValue is the first temporary value that is finally acquired.

Specifically, the coordinates (xCurr, yCurr) of the current block are set to (x0, y0), and the coordinates (xNbL, yNbL) of the left adjacent block are set to (x0−1, y0). Whether the left adjacent block is available is derived from (xNbL, yNbL), (x0, y0), and cIdx, and a result is assigned to availableL. availableL indicates whether the left adjacent block is available.

The coordinates (xNbA, yNbA) of the upper adjacent block are set to (x0, y0−1). Whether the upper adjacent block is available is derived from (xNbA, yNbA), (x0, y0), and cIdx, and a result is assigned to availableA. availableA indicates whether the upper adjacent block is available.

The coordinates (xNbN, yNbN) of the N-th related block are set to (x0−Nx, y0−Ny). Whether the N-th related block is available is derived from (x0−Nx, y0−Ny), (x0, y0), and cIdx, where the coordinates (xCurr, yCurr) of the current block are input as cIdx, and a result is assigned to availableN. availableN indicates whether the N-th related block is available.

ctxInc is then matched. A possible method is ctxInc=tempValue. Alternatively, ctxInc=tempValue/M1, where M1 is an integer. For example, M1 is configured to be 1, 2, 3, 4, or 5 according to the context. Alternatively, ctxInc=tempValue>>M2, where >> represents right-shifting, because the cost of right-shifting is much less than that of a division in hardware implementation. Alternatively, ctxInc is written as ctxInc=tempValue<THR0?0: (tempValue<THR1?1:2). THR0 and THR1 are thresholds, and the two thresholds are used to divide the tempValue into three value ranges, that is, tempValue<THR0, THR0≤tempValue<THR1, and THR1≤tempValue. In actual application, one threshold may be used to divide tempValue into two value ranges, or a plurality of thresholds may be used to divide tempValue into more value ranges. Exemplarily, the context increment may be 0, 1, 2, 3, . . . , and so on.

In some embodiments, the information of the related blocks include: an availability flag and a context index reference value of a first syntax element of each related block, and the operation that a first temporary value is determined based on the information of the plurality of related blocks includes operations that: weights of the plurality of related blocks are acquired; an AND operation is performed on the availability flag and the context index reference value of each related block to acquire an AND operation result; a weighting operation is performed on the AND operation result of each related block based on the weights of the plurality of related blocks; and the first temporary value is acquired based on a weighting result of each related block.

In actual application, the first temporary value is acquired by performing a summation operation on the weighting results, or performing an OR operation on the weighting results, or performing an AND operation on the weighting results, or the like.

Exemplarily, the first temporary value (tempValue) is set. tempValue is initialized to 0. The coded syntax elements of the x-th related block are availablex and condx, where x ranges from 0 to N. The following operation is performed from x=0 to x=N: tempValue+=(availablex&&condx) *weightx. In the example shown in FIG. 9, N is 24, and may be changed to a corresponding value when a different number of related blocks are used. weightx may be determined according to the position of the related block x, for example, by determining the ring in which the related block x is located as mentioned above.

ctxInc is then matched. A possible method is ctxInc=tempValue. Alternatively, ctxInc=tempValue/M1, where M1 is an integer. For example, M1 is configured to be 1, 2, 3, 4, or 5 according to the context. Alternatively, ctxInc=tempValue>>M2, where >> represents right-shifting, because the cost of right-shifting is much less than that of a division in hardware implementation. Alternatively, ctxInc is written as ctxInc=tempValue<THR0?0: (tempValue<THR1?1:2). THR0 and THR1 are thresholds, and the two thresholds are used to divide the tempValue into three value ranges, that is, tempValue<THR0, THR0≤tempValue<THR1, and THR1≤tempValue. In actual application, one threshold may be used to divide tempValue into two value ranges, or a plurality of thresholds may be used to divide tempValue into more value ranges.

In some embodiments, when the first syntax element corresponds to a plurality of context sets, the operation that a context index increment for the first syntax element of the current block is determined based on the information of the plurality of related blocks includes operation that: a first temporary value is determined based on the information of the plurality of related blocks; and a second temporary value is determined based on a context set index corresponding to the first syntax element and the number of contexts in each context set; conversion is performed on the first temporary value based on a preset conversion algorithm to acquire a third temporary value; and the context index increment for the first syntax element of the current block is acquired based on the second temporary value and the third temporary value.

That is, the syntax element may directly correspond to one or more contexts, or may correspond to one or more context sets, each context set including a plurality of contexts. When the first syntax element corresponds to a plurality of context sets, the third temporary value is used for indexing a context in a certain context set. Therefore, it is further necessary to determine the second temporary value according to the context set index and the number of contexts. The second temporary value is used as an offset of the context set for indexing the first context in the context set. The context index increment is acquired by summing the second temporary value and the third temporary value and is used for determining a context in a context set.

Exemplarily, when a context set is set for some syntax elements, ctxInc+=ctxSetIdx*P, where ctxSetIdx is the index of the context set, ctxSetIdx may be 0, 1, 2, 3, and so on, P is the number of contexts in the context set, and P may be 2, 3, 4, 5, and so on.

Exemplarily, for syntax elements alf_ctb_flag[cIdx] [xCtb][yCtb], alf_ctb_cc_cb_idc[xCtb][yCtb], alf_ctb_cc_ cr_idc[xCtb][yCtb], split_qt_flag,split_cu_flag, cu_skip_ flag[x0][y0], pred_mode_ibc_flag[x0][y0], intra_mip_flag, inter_affine_flag[x0][y0], and merge_subblock_flag[x0] [y0], there are three context sets for VVC, and one set includes three contexts.

By using the above technical solution, more related blocks are selected for the current block by setting a larger predetermined region, so that a spatial correlation between picture blocks is fully utilized, and a more suitable context can be matched for a first syntax element of the current block, improving compression efficiency for syntax elements and accordingly improving the compression efficiency of the entire system.

Figure 16:
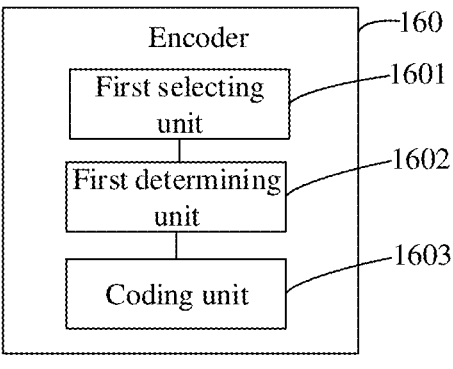
FIG. 16 is a first schematic structure diagram of an encoder provided in an embodiment of the present application.

To implement the method according to the embodiments of the present application, the embodiments of the present application further provide an encoder based on the same inventive concept. As shown in FIG. 16, the encoder 160 includes a first selecting unit 1601, a first determining unit 1602 and a coding unit 1603.

The first selecting unit 1601 is configured to select, from a predetermined region, a plurality of coded related blocks corresponding to a current block, herein the predetermined region includes a region having a correlation with the current block.

The first determining unit 1602 is configured to determine a context index parameter for a first syntax element of the current block based on information of the plurality of related blocks.

The coding unit 1603 is configured to code the first syntax element of the current block based on a context corresponding to the context index parameter.

In some embodiments, the predetermined region includes an adjacent region of the current block and/or a non-adjacent region of the current block. When the predetermined region includes an adjacent region of the current block, the related blocks include adjacent blocks of the current block, and when the predetermined region includes a non-adjacent region of the current block, the related blocks include non-adjacent blocks of the current block. It should be noted that not only adjacent blocks have a spatial correlation with the current block, but nearby non-adjacent blocks also have a spatial correlation with the current block. This is also easily understandable, as all contents in the predetermined region are correlated. That is, in addition to using spatially adjacent blocks, nearby non-adjacent blocks can also be used, or both adjacent blocks and non-adjacent blocks are used, so as to select a context for the current block with reference to a sufficient number of related blocks. In this way, more related blocks are selected for a current block by setting a larger predetermined region, so that a spatial correlation between image blocks is fully utilized, and a more suitable context is matched for a first syntax element of the current block according to more related blocks, preventing an accidental event from affecting selection of the context.

In some embodiments, the coder further includes a setting unit, which is configured to configure weights for the related blocks based on distances between the related blocks and the current block.

In some embodiments, the setting unit is configured to configure a weight for the related blocks based on coordinates of the related blocks and coordinates of the current block.

In some embodiments, the setting unit is configured to determine a first sub-region in which the related blocks are located, herein the first sub-region is at least one of at least two second sub-regions comprised in the predetermined region; and configure weights for the related blocks based on the first sub-region in which the related blocks are located.

In some embodiments, the predetermined region may include an adjacent region of the current block and a non-adjacent region of the current block. In this way, the strength of the spatial correlation is considered, and the accuracy of selection of the context can be further improved by setting the weight of the related block.

In some embodiments, the first selecting unit 1601 is configured to determine, in the predetermined region, coordinates of the related blocks based on coordinates of the current block; and acquire the information of the related blocks based on the coordinates of the related block.

In some embodiments, the first selecting unit 1601 is configured to acquire the information of the related blocks based on a preset selection order and the coordinates of the related blocks.

In some embodiments, information of a related block includes: a context index reference value of a first syntax element of the related block.

In some embodiments, the information of the related block further includes: an availability flag of the related block.

In some embodiments, the first determining unit 1602 is configured to determine a context index offset corresponding to the first syntax element; determine a context index increment for the first syntax element of the current block based on the information of the plurality of related blocks;

determine the context index for the first syntax element based on the context index increment and the context index offset; and set the context index parameter to be equal to the context index.

In some embodiments, the first determining unit 1602 is configured to determine a first temporary value based on the information of the plurality of related blocks; and perform conversion on the first temporary value based on a preset conversion algorithm to acquire the context index increment for the first syntax element of the current block.

In some embodiments, when the first syntax element corresponds to a plurality of context sets, the first determining unit 1602 is configured to determine a first temporary value based on the information of the plurality of related blocks; determine a second temporary value based on a context set index corresponding to the first syntax element and the number of contexts in each context set; perform conversion on the first temporary value based on a preset conversion algorithm to acquire a third temporary value; and acquire the context index increment for the first syntax element of the current block based on the second temporary value and the third temporary value.

In some embodiments, the information of the related blocks include: an availability flag and a context index reference value of a first syntax element of each related block, and the first determining unit 1602 is configured to perform an AND operation on the availability flag and the context index reference value of each related block to acquire an AND operation result; and acquire the first temporary value based on the AND operation result of each related block.

In some embodiments, the information of the related blocks include: an availability flag and a context index reference value of a first syntax element of each related block, and the first determining unit 1602 is configured to acquire weights of the plurality of related blocks; perform an AND operation on the availability flag and the context index reference value of each related block to acquire an AND operation result; perform a weighting operation on the AND operation result of each related block based on the weights of the plurality of related blocks; and acquire the first temporary value based on a weighting result of each related block.

In some embodiments, the preset conversion algorithm includes at least one of the following: setting the first temporary value to be equal to the context index increment; dividing the first temporary value by a first reference value to acquire the context index increment; right-shifting the first temporary value by a second reference value to acquire the context index increment; and determining a first value range in which the first temporary value is located, and using an index increment corresponding to the first value range as the context index increment.

In some embodiments, the first determining unit 1602 is configured to determine a first context list used when selecting a context for the first syntax element; and set the context index parameter to an index of the first context list.

Figure 17:
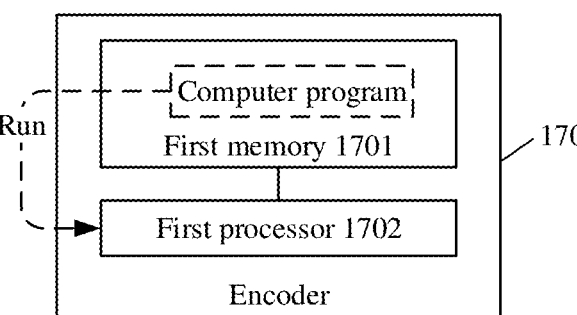
FIG. 17 is a second schematic structure diagram of an encoder provided in an embodiment of the present application.

In actual application, the embodiments of the present application further provide an encoder. FIG. 17 is a second schematic structure diagram of an encoder in an embodiment of the present application. As shown in FIG. 17, the encoder 170 includes: a first memory 1701 and a first processor 1702. The first memory 1701 is configured to store a computer program executable on the first processor 1702, and the first processor 1702 is configured to implement, when executing the program, a coding method at an encoder side.

By using the above solution, more related blocks are selected for the current block by setting a larger predetermined region, so that a spatial correlation between image blocks is fully utilized, and a more suitable context can be matched for a first syntax element of the current block, improving compression efficiency for syntax elements and accordingly improving the compression efficiency of the entire system.

Figure 18:
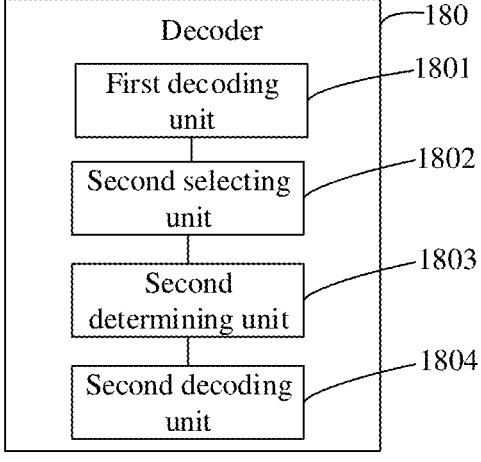
FIG. 18 is a first schematic structure diagram of a decoder provided in an embodiment of the present application.

The embodiments of the present application provide a decoder. FIG. 18 is a first schematic structure diagram of a decoder in an embodiment of the present application. As shown in FIG. 18, the decoder 180 includes a first decoding unit 1801, a second selecting unit 1802, a second determining unit 1803 and a second decoding unit 1804.

The first decoding unit 1801 is configured to decode a bitstream to acquire information to be decoded of a first syntax element of a current block.

The second selecting unit 1802 is configured to select, from a predetermined region, a plurality of decoded related blocks corresponding to the current block, herein the predetermined region includes a region having a correlation with the current block.

The second determining unit 1803 is configured to determine a context index parameter for the first syntax element of the current block based on information of the plurality of related blocks.

The second decoding unit 1804 is configured to decode the information to be decoded based on a context corresponding to the context index parameter to acquire the first syntax element of the current block.

In some embodiments, the predetermined region includes an adjacent region of the current block and/or a non-adjacent region of the current block. When the predetermined region includes an adjacent region of the current block, the related blocks include adjacent blocks of the current block, and when the predetermined region includes a non-adjacent region of the current block, the related blocks include non-adjacent blocks of the current block. It should be noted that not only adjacent blocks have a spatial correlation with the current block, but nearby non-adjacent blocks also have a spatial correlation with the current block. This is also easily understandable, as all contents in the predetermined region are correlated. That is, in addition to using spatially adjacent blocks, nearby non-adjacent blocks can also be used, or both adjacent blocks and non-adjacent blocks are used, so as to select a context for the current block with reference to a sufficient number of related blocks. In this way, more related blocks are selected for the current block by setting a larger predetermined region, so that a spatial correlation between image blocks is fully utilized, and a more suitable context is matched for a first syntax element of the current block according to more related blocks, preventing an accidental event from affecting selection of the context.

In some embodiments, the decoder further includes a setting unit, which is configured to configure weights for the related blocks based on distances between the related blocks and the current block.

In some embodiments, the setting unit is configured to configure weights for the related blocks based on coordinates of the related blocks and coordinates of the current block.

In some embodiments, the setting unit is configured to determine a first sub-region in which the related blocks are located, herein the first sub-region is at least one of at least two second sub-regions comprised in the predetermined region; and configure weights for the related blocks based on the first sub-region in which the related blocks are located.

In some embodiments, the predetermined region may include an adjacent region of the current block and a non-adjacent region of the current block. In this way, the strength of the spatial correlation is considered, and the accuracy of selection of the context can be further improved by setting the weight of the related block.

In some embodiments, the second selecting unit 1802 is configured to determine, in the predetermined region, coordinates of the related blocks based on coordinates of the current block; and acquire the information of the related blocks based on the coordinates of the related blocks.

In some embodiments, the second selecting unit 1802 is configured to acquire the information of the related blocks based on a preset selection order and the coordinates of the related blocks.

In some embodiments, the information of the related blocks include: a context index reference value of a first syntax element of each related block.

In some embodiments, the information of the related blocks further includes: an availability flag of each related block.

In some embodiments, the second determining unit 1803 is configured to determine a context index offset corresponding to the first syntax element; determine a context index increment for the first syntax element of the current block based on the information of the plurality of related blocks; determine the context index for the first syntax element based on the context index increment and the context index offset; and set the context index parameter to be equal to the context index.

In some embodiments, the second determining unit 1803 is configured to determine a first temporary value based on the information of the plurality of related blocks; and performing conversion on the first temporary value based on a preset conversion algorithm to acquire the context index increment for the first syntax element of the current block.

In some embodiments, when the first syntax element corresponds to a plurality of context set, the second determining unit 1803 is configured to determine a first temporary value based on the information of the plurality of related blocks; determine a second temporary value based on a context set index corresponding to the first syntax element and the number of contexts in each context set; perform conversion on the first temporary value based on a preset conversion algorithm to acquire a third temporary value; and acquire the context index increment for the first syntax element of the current block based on the second temporary value and the third temporary value.

In some embodiments, the information of the related blocks includes: an availability flag and a context index reference value of a first syntax element of each related block, and the second determining unit 1803 is configured to perform an AND operation on the availability flag and the context index reference value of each related block to acquire an AND operation result; and acquire the first temporary value based on the AND operation result of each related block.

In some embodiments, the information of the related blocks includes: an availability flag and a context index reference value of a first syntax element of each related block, and the second determining unit 1803 is configured to acquire weights of the plurality of related blocks; perform an AND operation on the availability flag and the context index reference value of each related block to acquire an AND operation result; perform a weighting operation on the AND operation result of each related block based on the weights of the plurality of related blocks; and acquire the first temporary value based on a weighting result of each related block.

In some embodiments, the preset conversion algorithm includes at least one of the following: setting the first temporary value to be equal to the context index increment; dividing the first temporary value by a first reference value to acquire the context index increment; right-shifting the first temporary value by a second reference value to acquire the context index increment; and determining a first value range in which the first temporary value is located, and using an index increment corresponding to the first value range as the context index increment.

In some embodiments, the second determining unit 1803 is configured to determine a first context list used when selecting a context for the first syntax element; and set the context index parameter to an index of the first context list.

Figure 19:
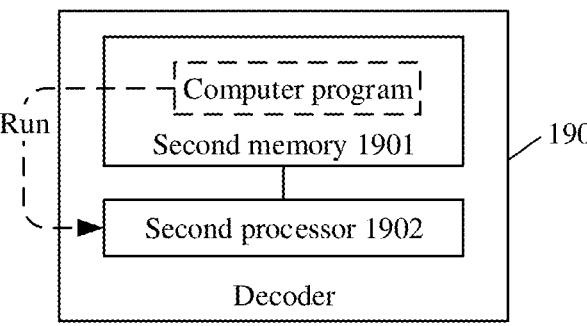
FIG. 19 is a second schematic structure diagram of a decoder provided in an embodiment of the present application.

In actual application, the embodiments of the present application further provide a decoder. FIG. 19 is a second schematic structure diagram of a decoder in an embodiment of the present application. As shown in FIG. 19, the decoder 190 includes: a second memory 1901 and a second processor 1902. The second memory 1901 is configured to store a computer program executable on the second processor 1902, and the second processor 1902 is configured to implement, when executing the program, a decoding method at a decoder side.

By using the above technical solution, more related blocks are selected for the current block by setting a larger predetermined region, so that a spatial correlation between image blocks is fully utilized, and a more suitable context can be matched for a first syntax element of the current block, improving compression efficiency for syntax elements and accordingly improving the compression efficiency of the entire system.

In addition, various functional units in this embodiment may be integrated in one processing unit, or each unit may be individually physically present, or two or more units may be integrated into one unit. The integrated units described above may be implemented in the form of hardware or in the form of software functional modules.

Correspondingly, the embodiments of the present application provide a storage medium having a computer program stored thereon. The computer program, when executed by a first processor, implements a coding method for an encoder; or the computer program, when executed by a second processor, implements a decoding method for a decoder.

It should be pointed out here that: the above description of the storage medium and apparatus embodiments is similar to the description of the method embodiments described above, and has similar beneficial effects as the method embodiments. For technical details not disclosed in the storage medium and apparatus embodiments of the present application, reference is made to the description of the method embodiments of the present application for understanding.

Provided above are merely the embodiments of the present application, but the scope of protection of the present application is not limited thereto. Variations or substitutions within the technical scope disclosed in the present application that are easily conceivable to any person skilled in the art should be covered in the scope of protection of the present application. Therefore, the scope of protection of the present application should be defined by the scope of protection of the claims.

INDUSTRIAL APPLICABILITY

The present application provides coding and decoding methods, an encoder, a decoder, and a storage medium. The coding method includes operations that: a plurality of coded related blocks corresponding to a current block are selected from a predetermined region, herein the predetermined region includes a region having a correlation with the current block; a context index parameter for a first syntax element of the current block is determined based on information of the plurality of related blocks; and the first syntax element of the current block is coded based on a context corresponding to the context index parameter. In this way, more related blocks are selected for the current block by setting a larger predetermined region, so that a spatial correlation between image blocks is fully utilized, and a more suitable context can be matched for a first syntax element of the current block, improving compression efficiency for syntax elements and accordingly improving the compression efficiency of the entire system.

The invention claimed is:

1. A coding method, applied to an encoder, comprising:
   selecting, from a predetermined region, a plurality of coded related blocks corresponding to a current block, wherein the predetermined region comprises a region having a correlation with the current block;
   determining, based on information of the plurality of related blocks, a context index parameter for a first syntax element of the current block; and
   coding, based on a context corresponding to the context index parameter, the first syntax element of the current block,
   wherein the predetermined region comprises a non-adjacent region of the current block and the related blocks comprise non-adjacent blocks of the current block.

2. The method of claim 1, wherein
   the predetermined region further comprises an adjacent region of the current block and the related blocks further comprise adjacent blocks of the current block.

3. The method of claim 1, further comprising:
   configuring, based on distances between the related blocks and the current block, weights for the related blocks, or
   configuring, based on coordinates of the related blocks and coordinates of the current block, weights for the related blocks.

4. The method of claim 1, wherein information of a related block comprises: a context index reference value of a first syntax element of the related block and an availability flag of the related block.

5. The method of claim 1, wherein determining, based on the information of the plurality of related blocks, the context index parameter for the first syntax element of the current block comprises:
   determining a context index offset corresponding to the first syntax element;
   determining, based on the information of the plurality of related blocks, a context index increment for the first syntax element of the current block;
   determining, based on the context index increment and the context index offset, the context index of the first syntax element; and
   setting the context index parameter to be equal to the context index.

6. The method of claim 5, wherein determining, based on the information of the plurality of related blocks, the context index increment for the first syntax element of the current block comprises:

determining, based on the information of the plurality of related blocks, a first temporary value; and performing, based on a preset conversion algorithm, conversion on the first temporary value to acquire the context index increment for the first syntax element of the current block.

7. The method of claim 6, wherein the information of the related blocks comprises: an availability flag and a context index reference value of a first syntax element of each related block, and determining, based on the information of the plurality of related blocks, the first temporary value comprises:

acquiring weights of the plurality of related blocks;

performing an AND operation on the availability flag and the context index reference value of each related block to acquire an AND operation result;

performing, based on the weights of the plurality of related blocks, a weighting operation on the AND operation result of each related block; and acquiring, based on a weighting result of each related block, the first temporary value.

8. A decoding method, applied to a decoder, comprising:

decoding a bitstream to acquire information to be decoded of a first syntax element of a current block;

selecting, from a predetermined region, a plurality of decoded related blocks corresponding to the current block, wherein the predetermined region comprises a region having a correlation with the current block;

determining, based on information of the plurality of related blocks, a context index parameter for the first syntax element of the current block; and decoding, based on a context corresponding to the context index parameter, the information to be decoded to acquire the first syntax element of the current block, wherein the predetermined region comprises a non-adjacent region of the current block and the related blocks comprise non-adjacent blocks of the current block.

9. The method of claim 8, wherein the predetermined region further comprises an adjacent region of the current block and the related blocks further comprise adjacent blocks of the current block.

10. The method of claim 8, further comprising:

configuring, based on distances between the related blocks and the current block, weights for the related blocks, or configuring, based on coordinates of the related blocks and coordinates of the current block, weights for the related blocks.

11. The method of claim 8, wherein information of a related block comprises: a context index reference value of a first syntax element of the related block and an availability flag of the related block.

12. The method of claim 8, wherein determining, based on the information of the plurality of related blocks, the context index parameter for the first syntax element of the current block comprises:

determining a context index offset corresponding to the first syntax element;

determining, based on the information of the plurality of related blocks, a context index increment for the first syntax element of the current block;

determining, based on the context index increment and the context index offset, the context index of the first syntax element; and setting the context index parameter to be equal to the context index.

13. The method of claim 12, wherein determining, based on the information of the plurality of related blocks, the context index increment for the first syntax element of the current block comprises:

determining, based on the information of the plurality of related blocks, a first temporary value; and performing, based on a preset conversion algorithm, conversion on the first temporary value, to acquire the context index increment for the first syntax element of the current block.

14. The method of claim 13, wherein the information of the related blocks comprises: an availability flag and a context index reference value of a first syntax element of each related block, and determining, based on the information of the plurality of related blocks, the first temporary value comprises:

acquiring weights of the plurality of related blocks;

performing an AND operation on the availability flag and the context index reference value of each related block to acquire an AND operation result;

performing, based on the weights of the plurality of related blocks, a weighting operation on the AND operation result of each related block; and acquiring, based on a weighting result of each related block, the first temporary value.

15. A decoder, comprising:

a memory for storing a computer program; and a processor, wherein the processor is configured to execute the computer program to perform the following operations:

decoding a bitstream to acquire information to be decoded of a first syntax element of a current block;

selecting, from a predetermined region, a plurality of decoded related blocks corresponding to the current block, wherein the predetermined region comprises a region having a correlation with the current block;

determining, based on information of the plurality of related blocks, a context index parameter for the first syntax element of the current block; and decoding, based on a context corresponding to the context index parameter, the information to be decoded to acquire the first syntax element of the current block, wherein the predetermined region comprises a non-adjacent region of the current block and the related blocks comprise non-adjacent blocks of the current block.

16. The decoder of claim 15, wherein the processor is further configured to execute the computer program to:

configure, based on distances between the related blocks and the current block, weights for the related blocks, or configure, based on coordinates of the related blocks and coordinates of the current block, weights for the related blocks.

17. The decoder of claim 15, wherein information of a related block comprises: a context index reference value of a first syntax element of the related block and an availability flag of the related block.

18. The decoder of claim 15, wherein the processor is further configured to execute the computer program to:

determine a context index offset corresponding to the first syntax element;

determine, based on the information of the plurality of related blocks, a first temporary value;

perform, based on a preset conversion algorithm, conversion on the first temporary value, to acquire a context index increment for the first syntax element of the current block;

determine, based on the context index increment and the context index offset, the context index of the first syntax element; and set the context index parameter to be equal to the context index.

19. An encoder, comprising:

a memory for storing a computer program; and a processor, wherein the processor is configured to execute the computer program to implement the following operations:

selecting, from a predetermined region, a plurality of coded related blocks corresponding to a current block, wherein the predetermined region comprises a region having a correlation with the current block;

determining, based on information of the plurality of related blocks, a context index parameter for a first syntax element of the current block; and coding, based on a context corresponding to the context index parameter, the first syntax element of the current block, wherein the predetermined region comprises a non-adjacent region of the current block and the related blocks comprise non-adjacent blocks of the current block.

20. A non-transitory computer-readable storage medium, having a computer program and a bitstream stored thereon, wherein the computer program, when executed by a processor, enables the processor to perform the steps of the encoding method of claim 1 to generate the bitstream.

\* \* \* \* \*